(12) United States Patent
Yu et al.

(10) Patent No.: US 11,630,217 B2
(45) Date of Patent: Apr. 18, 2023

(54) METHODS AND DEVICES FOR GLOBAL NAVIGATION SATELLITE SYSTEM (GNSS) SIGNAL ACQUISITION

(71) Applicant: Deere & Company, Moline, IL (US)

(72) Inventors: Wei Yu, Torrance, CA (US); Richard G. Keegan, Palos Verdes Estates, CA (US); Mark P. Kaplan, Culver City, CA (US)

(73) Assignee: Deere & Company, Moline, IL (US)

( * ) Notice: Subject to any disclaimer, the term of this patent is extended or adjusted under 35 U.S.C. 154(b) by 177 days.

(21) Appl. No.: 16/862,360

(22) Filed: Apr. 29, 2020

(65) Prior Publication Data

US 2022/0357461 A1 Nov. 10, 2022

Related U.S. Application Data

(60) Provisional application No. 62/851,004, filed on May 21, 2019.

(51) Int. Cl.
*G01S 19/29* (2010.01)
*G01S 19/30* (2010.01)
(Continued)

(52) U.S. Cl.
CPC .............. *G01S 19/29* (2013.01); *G01S 19/30* (2013.01); *G01S 19/37* (2013.01); *H04B 1/7075* (2013.01); *H04B 2201/70715* (2013.01)

(58) Field of Classification Search
CPC ............................. H04B 1/709; H04B 1/7095
See application file for complete search history.

(56) References Cited

U.S. PATENT DOCUMENTS 5,293,402 A 3/1994 Crespo et al.
6,466,958 B1 * 10/2002 Van Wechel ............ G01S 19/24
375/150
(Continued)

FOREIGN PATENT DOCUMENTS

WO WO 2018/019960 A1 2/2018

OTHER PUBLICATIONS

Rovelli, D. et al. "Acquisition speed-up engine for GNSS signals," 2010 5th ESA Workshop on Satellite Navigation Technologies and European Workshop on GNSS Signals and Signal Processing (NAVITEC), 2010, pp. 1-8. (Year: 2010).*

(Continued)

*Primary Examiner* — Gregory C. Issing
(74) *Attorney, Agent, or Firm* — Morgan, Lewis & Bockius LLP

(57) ABSTRACT

A method is provided for acquiring a signal from a satellite in a global navigation satellite system. The signal includes a pseudorandom code. The method includes, for each time period of a plurality of time periods: generating samples of the signal, segments of the samples of the signal are correlated with a local copy of the pseudorandom code, thereby producing correlation values for the time period. A discrete Fourier transform is performed using, as inputs, the correlation values for the respective time period, thereby producing a frequency representation of the correlation values for the time period. The frequency representations of the correlation values for the plurality of time periods are combined according to a data hypothesis. When a magnitude of the combined frequency representations meets predefined criteria, a frequency corresponding to the magnitude is selected as a tracking frequency for the satellite.

20 Claims, 16 Drawing Sheets

(51) Int. Cl.
    *G01S 19/37*     (2010.01)
    *H04B 1/7075*     (2011.01)

(56) References Cited

U.S. PATENT DOCUMENTS

| | | | | |
|---|---|---|---|---|
| 6,512,479 | B1* | 1/2003 | Sahai | G01S 19/24 |
| | | | | 342/357.77 |
| 6,567,042 | B2* | 5/2003 | Lin | H04B 1/7077 |
| | | | | 342/357.77 |
| 6,720,917 | B2* | 4/2004 | Lin | H04B 1/70753 |
| | | | | 342/357.69 |
| 6,735,243 | B1* | 5/2004 | Akopian | G01S 19/29 |
| | | | | 375/150 |
| 6,909,736 | B2* | 6/2005 | Akopian | H04B 1/7075 |
| | | | | 375/E1.003 |
| 7,486,749 | B2* | 2/2009 | Pietila | G01S 19/29 |
| | | | | 375/150 |
| 7,495,610 | B1* | 2/2009 | Norman | G01S 19/37 |
| | | | | 375/150 |
| 7,499,485 | B2* | 3/2009 | Cho | H04B 1/707 |
| | | | | 375/150 |
| 7,702,002 | B2* | 4/2010 | Krasner | G01S 19/29 |
| | | | | 701/472 |
| 7,920,093 | B2* | 4/2011 | Heckler | G01S 19/246 |
| | | | | 342/357.77 |
| 8,013,789 | B2 | 9/2011 | Van Graas et al. | |
| 9,063,224 | B2 | 6/2015 | De Latour | |
| 2003/0227963 | A1* | 12/2003 | Dafesh | G01S 19/246 |
| | | | | 375/150 |
| 2004/0095274 | A1* | 5/2004 | Warloe | G01S 19/30 |
| | | | | 342/357.63 |
| 2004/0176034 | A1 | 9/2004 | Hunter et al. | |
| 2007/0008217 | A1* | 1/2007 | Yang | G01S 19/29 |
| | | | | 375/150 |
| 2010/0141520 | A1* | 6/2010 | Ghinamo | G01S 19/24 |
| | | | | 342/357.63 |
| 2011/0241937 | A1* | 10/2011 | Choi | G01S 19/30 |
| | | | | 342/357.69 |
| 2012/0195401 | A1* | 8/2012 | Becker | H04L 7/042 |
| | | | | 375/368 |
| 2017/0180160 | A1 | 6/2017 | Moorti et al. | |
| 2019/0268036 | A1* | 8/2019 | Macleod | H04B 1/7075 |
| 2020/0295849 | A1 | 9/2020 | Li | |
| 2020/0334542 | A1 | 10/2020 | Hoydis | |

OTHER PUBLICATIONS

Cintio, The GREHDA Project: GALILEO Software Receiver for High Dynamic Applications, Sep. 25-28, 2007, 12 pgs.

Deere & Company, Extended European Search Report, EU Application No. 20175269.8, dated Oct. 12, 2020, 9 pgs.

Shu Ai Jing et al., Weak and Dynamic GNSS Signal Tracking Strategies for Flight Missions in the Space Service Volume, Sensors, Sep. 2, 2016, pp. 1-19, doi:10.3390/s16091412.

Frank Van Graas et al., Closed-Loop Sequential Signal Processing and Open-Loop Batch Processing Approaches for GNSS Receiver Design, IEEE Journal of Selected Topics in Signal Processing, vol. 3, No. 4, Aug. 2009, published on Jul. 17, 2009, pp. 571-586.

Frank Van Graas et al., Comparison of Two Approaches for GNSS Receiver Algorithms: Batch Processing and Sequential Processing Considerations, ION GNSS 18th International Technical Meeting of the Satellite Division, Sep. 13-16, 2005, pp. 200-211.

Davide Rovelli et al., Acquisition Speed-Up Engine for GNSS Signals, retrieved from internet on Mar. 24, 2022, pp. 1-8.

Yuheng Yang et al., A Novel VLSI Architecture for Multi-Constellation and Multi-Frequency GNSS Acquisition Engine, published on Dec. 19, 2018, pp. 655-665.

Hongyang Zhang et al., A 2-step GPS carrier tracking loop for urban vehicle applications, Journal of Systems Engineering and Electronics, vol. 28, No. 5, Oct. 2017, pp. 817-826, DOI: 10.21629/JSEE.2017.05.01.

Pablo E. Leibovich et al., Dedicated Hardware for FFT Based Fast Acquisition of GNSS Signals, retrieved from internet on Mar. 24, 2022, pp. 1-4.

Andrey Soloviev et al., Utilizing Batch Processing for GNSS Signal Tracking, ION Canada 2007 Batch Processing, Feb. 27, 2007, pp. 1-40, [online]. Retrieved from the Internet <URL: http://alberta.ion.org/wp-content/uploads/2007/02/07.02.27-Andrey-Soloviev-Batch-Processing-for-GNSS-Signal-Tracking,pdf>.

W. Wilde, JM. Sleewaegen, A. Simsky, C. Vandewiele, E. Peeters, J. Grauwen, F. Boon, New Fast Signal Acquisition Unit for GPS/Galileo Receivers, ENC GNSS 2006, Manchester, May 7-10, 2006, 12 pgs.

N. Shivaramaiah, A. Dempster, C. Rizos, Application of Mixed-radix FFT Algorithms in Multi-band GNSS Signal Acquisition Engines, Journal of Global Positioning Systems (2009), vol. 8, No. 2 pp. 174-186, 14 pgs.

* cited by examiner

1000

1002 For each respective time period of a plurality of time periods:

1004 Generate a plurality of samples of a signal from a satellite in a global navigation satellite system (GNSS). The signal includes a pseudorandom code for the satellite.

1006 Generating the plurality of samples of the signal includes: initially sampling the signal at an initial multiple of a frequency hypothesis; and decimating the initially sampled signal to produce the plurality of samples of the signal.

1008 Correlate a plurality of segments of the plurality of samples of the signal with a local copy of the pseudorandom code for the satellite, thereby producing a plurality of correlation values for the respective time period.

1010 Correlating the plurality of segments of the plurality of samples of the signal with the local copy of the pseudorandom code for the satellite for each respective time period of the plurality of time periods includes correlating $n$ segments of the plurality of samples of the signal with the local copy of the pseudorandom code, wherein $n$ is an integer.

Acquire a signal from a second satellite in a second global navigation satellite system (GNSS) distinct from the global navigation satellite system. The second signal includes a second pseudorandom code for the second satellite having a second predefined chip length. The buffer has a size that is greater than the second predefined chip length sampled at the respective frequency. —1142

For each respective code shift hypothesis of the plurality of code shift hypotheses:

correlate the first portion of the sampled signal with a local copy of a portion of the second pseudorandom code; and in accordance with a determination that the correlation of the first portion of the sampled signal with the local copy of the portion of the second pseudorandom code for the respective code shift hypothesis meets the matching criteria, select the code shift hypothesis for tracking the second satellite.

METHODS AND DEVICES FOR GLOBAL NAVIGATION SATELLITE SYSTEM (GNSS) SIGNAL ACQUISITION

RELATED APPLICATIONS

This application claims priority to U.S. Provisional Patent Application 62/851,004, filed May 21, 2019, which is hereby incorporated by reference in its entirety.

TECHNICAL FIELD

The disclosed embodiments relate generally to navigation systems that determine the position of a moveable object using navigation signals received from a plurality of satellites, and more methods and devices for acquiring signals from such satellites.

BACKGROUND

Global Navigation Satellite Systems (GNSS), such as GPS, GLONASS, Galileo and BeiDou, are used in many applications. In a GNSS system, each satellite transmits a signal that identifies the satellite and allows a receiver to determine the time at which the signal was sent. To do so, a GNSS satellite transmits a pseudorandom code (also called a pseudorandom noise (PRN) code). The pseudorandom code is, for example, a series of ones and zeroes that looks random, but in fact uniquely identifies the satellite. Using other data, such as ephemeris data and almanac data, that is encoded in the pseudorandom code using various modulation schemes (e.g., BPSK, BOC), the receiver can determine the time at which the signal was sent. Using four or more satellites, the receiver can determine its position (e.g., on Earth).

For this process to work, the GNSS receiver must "acquire" the satellite's signal. To acquire the signal, the GNSS receiver must determine several ambiguities, including the frequency of the received signal (e.g., the frequency at which so-called "chips" of the PRN code are received) and the offset to the PRN code (e.g., the phase of the PRN code). Thus, acquiring the satellite's signal includes, at the very least, determining the correct frequency (e.g., the chipping frequency) and code shift (sometimes called a code offset) of the satellite signal, as received at the receiver. The conventional way to do so is to guess-and-check: the receiver uses all of the possible "frequency hypotheses" and "code shift hypotheses" until the correct combination is found.

This process can be slow, especially for modern GNSS signals, which tend to use longer PRN codes, implying a greater number of code shift hypotheses. In addition, some modern GNSS systems use modulation types that require finer code shift hypotheses (e.g., BOC versus BPSK modulation). For example, conventional systems may require on the order of 60 seconds to acquire a Galileo—E1B/E1C signal from each satellite, which has a chip length of 4092 chips (compared with 1023 for GPS—C/A) and a modulation scheme that requires twice the number of code shift hypotheses as compared to GPS—C/A.

Thus, there is a need for systems and methods that can more quickly acquire GNSS satellite signals.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10B illustrate a flow chart of a method of acquiring a signal from a satellite in a global navigation satellite system (GNSS), and more particularly, of acquiring a tracking frequency for the satellite, in accordance with some embodiments.

FIGS. 11A-11D illustrate a flow chart of a method of acquiring a signal from a satellite in a global navigation satellite system (GNSS), and more particularly, of acquiring a code shift for the satellite, in accordance with some embodiments.

SUMMARY

Figure 1:
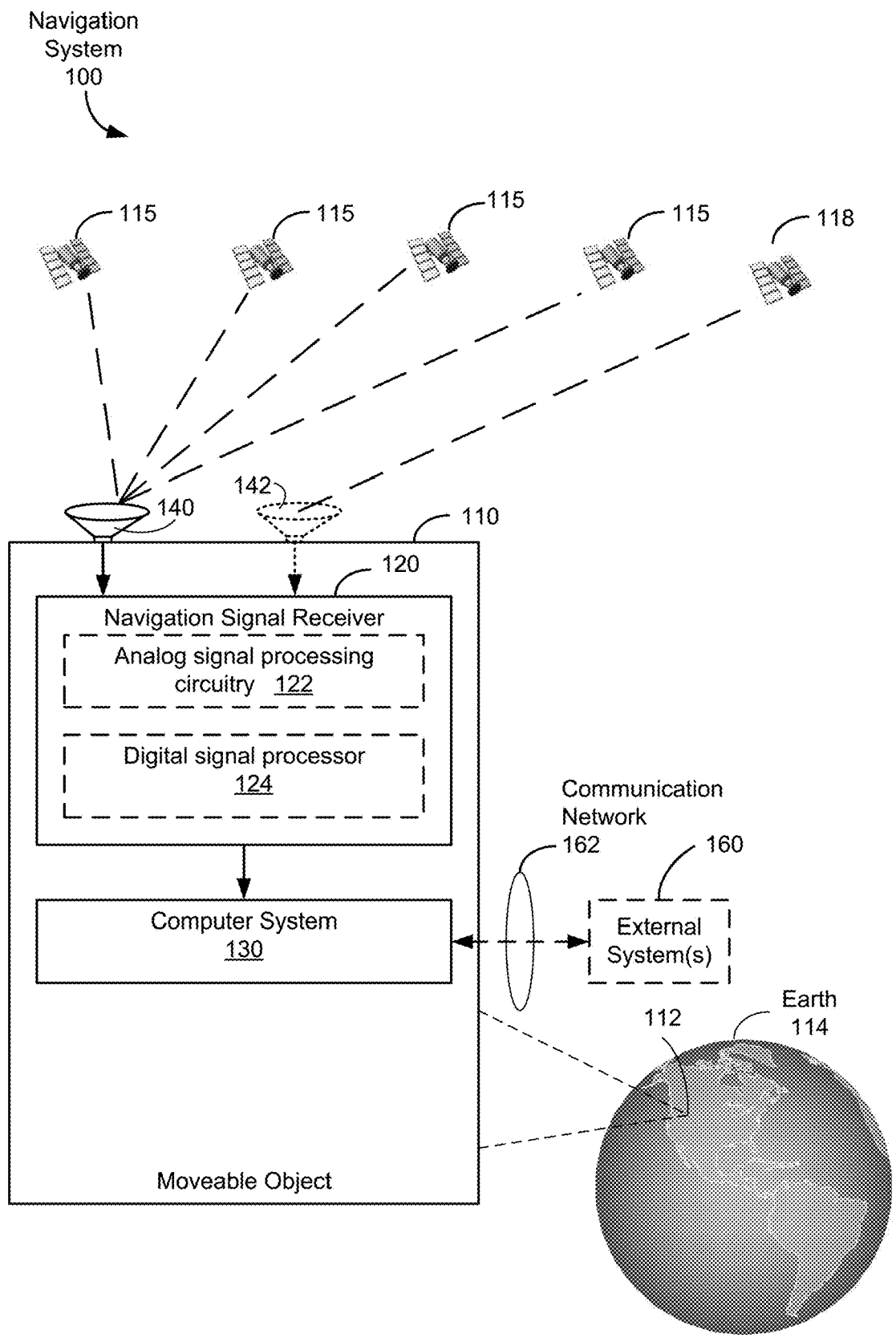
FIG. 1 is a block diagram illustrating a navigation system, according to some embodiments.

Some embodiments provide a system, computer readable storage medium storing instructions, or a method for acquiring a signal from a satellite in a global navigation satellite system (GNSS), (A1) In some embodiments, a method is performed at a global navigation satellite system (GNSS) receiver that includes one or more processors and instructions for execution by the one or more processor. The method includes acquiring a signal from a satellite in a global navigation satellite system (GNSS). The signal includes a pseudorandom code for the satellite. The acquiring includes, for each respective time period of a plurality of time periods: generating a plurality of samples of the signal; correlating a plurality of segments of the plurality of samples of the signal with a local copy of the pseudorandom code for the satellite, thereby producing a plurality of correlation values for the respective time period; performing a discrete Fourier transform (DFT) using, as inputs, the plurality of correlation values for the respective time period, thereby producing a frequency representation of the correlation values for the respective time period; combining the frequency representations of the correlation values for the plurality of time periods according to a data hypothesis; and, in accordance with a determination that a magnitude of the combined frequency representations of the correlation values for the plurality of time periods meets predefined criteria, selecting a frequency corresponding to the magnitude as a tracking frequency for the satellite. The method further includes determining a position of the GNSS receiver using the acquired signal at least in part by tracking the signal from the satellite using the tracking frequency.

(A2) In some embodiments of (A1), each correlated segment of the plurality of samples of the signal corresponds to a length of time. The plurality of samples of the signal are generated using a coarse frequency hypothesis. The method includes repeating the generating, correlating, performing the DFT, and combining operations with adjacent coarse frequency hypotheses that are separated by an amount less than or equal to an inverse of the length of time.

(A3) In some embodiments of any of (A1)-(A2), the generating the plurality of samples of the signal includes: initially sampling the signal at an initial multiple of a frequency hypothesis; and decimating the initially sampled signal to produce the plurality of samples of the signal.

(A4) In some embodiments of any of (A1)-(A3), correlating the plurality of segments of the plurality of samples of the signal with the local copy of the pseudorandom code for the satellite for each respective time period of the plurality of time periods includes correlating n segments of the plurality of samples of the signal with the local copy of the pseudorandom code, wherein n is an integer greater than one. The DFT is an m-point DFT, wherein m is an integer greater than n. Performing the DFT includes using, as inputs, m−n zero values in addition to the n correlation values for the respective time period.

(A5) In some embodiments of (A4), each correlated segment of the plurality of samples of the signal corresponds to a length of time. An inverse of the length of time divided by m is less than a frequency tolerance for tracking the signal from the satellite using the tracking frequency.

(A6) In some embodiments of any of (A4)-(A5), performing the DFT for a respective time period of the plurality of time periods includes: using, as inputs, the n correlation values for the respective time period, wherein the n correlation values are shifted by n inputs of the DFT compared with the n correlation values for a previous and adjacent time period of the plurality of time periods.

(A7) In some embodiments of any of (A1)-(A6), the correlating, performing the discrete Fourier transform, and combining operations are performed for each of a plurality of code shift hypotheses.

(A8) In some embodiments of any of (A1)-(A7), for a respective frequency hypothesis, the correlating, performing the discrete Fourier transform, and combining operations are performed for each of a plurality of satellites.

(A9) In some embodiments of any of (A1)-(A8), the time period is a period of a complete instance of the pseudorandom code.

(B1) Further, in some embodiments, a method is performed at a global navigation satellite system (GNSS) receiver that includes one or more processors and instructions for execution by the one or more processors. The method includes acquiring a signal from a satellite in a global navigation satellite system (GNSS). The signal includes a pseudorandom code for the satellite having a predefined chip length for a complete instance of the pseudorandom code. The acquiring includes: sampling the signal at a respective frequency; storing a first portion of the sampled signal in a buffer, the buffer having a size that is less than the predefined chip length sampled at the respective frequency; for each respective code shift hypothesis of a plurality of code shift hypotheses: correlating the first portion of the sampled signal with a local copy of a portion of the pseudorandom code to produce a correlation of the first portion of the sampled signal with the local copy of the portion of the pseudorandom code; and in accordance with a determination that the correlation of the first portion of the sampled signal with the local copy of the portion of the pseudorandom code for the respective code shift hypothesis meets matching criteria, selecting the code shift hypothesis for tracking the satellite. The method further includes determining a position of the GNSS receiver using the acquired signal at least in part by tracking the signal from the satellite using the selected code shift hypothesis.

(B2) In some embodiments of (B1), the method further includes determining that none of the correlations for the plurality of code shift hypotheses meets the matching criteria; storing a second portion of sampled signal in the buffer, wherein the second portion of the sampled signal is distinct from the first portion of the sampled signal; for each respective code shift hypothesis of the plurality of code shift hypotheses: correlating the second portion of the sampled signal with the local copy of a portion of the pseudorandom code; and, in accordance with a determination that the correlation of the second portion of the sampled signal with the local copy of the portion of the pseudorandom code for the respective code shift hypothesis meets matching criteria, selecting the code shift hypothesis for tracking the satellite.

(B3) In some embodiments of (B2), the method further includes, prior to correlating the first portion of the sampled signal with the local copy of a portion of the pseudorandom code, buffering the local copy of the portion of the pseudorandom code. The correlating the second portion of the sampled signal with the local copy of the portion of the pseudorandom code is performed without re-buffering the local copy of the portion of the pseudorandom code.

(B4) In some embodiments of any of (B2)-(B3), correlating the first portion of the sampled signal with the local copy of the portion of the pseudorandom code for each respective code shift hypothesis of the plurality of code shift hypotheses comprises a first iteration of a plurality of buffer shift iterations. Correlating the second portion of the sampled signal with the local copy of the portion of the pseudorandom code for each respective code shift hypothesis of the plurality of code shift hypotheses comprises a second iteration of the plurality of buffer shift iterations. The method further includes: in accordance with a determination that exhaustion criteria, with respect to the sampling of the signal using the respective frequency, have been satisfied: re-sampling the signal at a second frequency different from the respective frequency; storing a third portion of signal sampled at the second frequency in the buffer; for each respective code shift hypothesis of the plurality of code shift hypotheses: correlating the third portion of the signal sampled at the second frequency with the local copy of the portion of the pseudorandom code; and, in accordance with a determination that the correlation of the third portion of signal sampled at the second frequency with the local copy of the portion of the pseudorandom code for the respective code shift hypothesis meets matching criteria, selecting the code shift hypothesis for tracking the satellite.

(B5) In some embodiments of (B4), the exhaustion criteria include a criterion that is met when a maximum number of buffer shift iterations has been exhausted without selecting a code shift hypothesis for the satellite.

(B6) In some embodiments of any of (B2)-(B5), the method further includes adding an offset to the code shift hypothesis for tracking the satellite based at least in part on an offset between the first portion of the sampled signal and the second portion of the sampled signal.

(B7) In some embodiments of any of (B1)-(B6), the method further includes acquiring a second signal from a second satellite in a second global navigation satellite system (GNSS) distinct from the global navigation satellite system. The second signal includes a second pseudorandom code for the second satellite having a second predefined chip length. The buffer has a size that is greater than the second predefined chip length sampled at the respective frequency.

(B8) In some embodiments of (B7), the acquiring includes: for each respective code shift hypothesis of the plurality of code shift hypotheses: correlating the first portion of the sampled signal with a local copy of a portion of the second pseudorandom code; in accordance with a determination that the correlation of the first portion of the sampled signal with the local copy of the portion of the second pseudorandom code for the respective code shift hypothesis meets the matching criteria, selecting the code shift hypothesis for tracking the second satellite.

(B9) In some embodiments of any of (B1)-(B8), the respective frequency is an integer multiple of a frequency hypothesis.

In some embodiments, a global navigation satellite system (GNSS) receiver is provided that includes one or more processors; and memory storing instructions which, when executed by a global navigation satellite system (GNSS) receiver that includes one or more processors, cause the GNSS receiver to perform any of the methods described herein.

In some embodiments, a global navigation satellite system (GNSS) receiver is provided that includes one or more processors and means for performing any of the methods described herein.

In some embodiments, a non-transitory computer-readable storage medium is provided that stores instructions which, when executed by a global navigation satellite system (GNSS) receiver that includes one or more processors, cause the GNSS receiver to perform the any of the methods described herein.

DESCRIPTION OF EMBODIMENTS

FIG. 1 is a block diagram illustrating a navigation system 100, according to some embodiments. Navigation system 100 enables a moveable object 110 (e.g., a phone, specialized GNSS receiver, a boat, a truck or other vehicle, a farming appliance, mining appliance, drilling system, etc.) to determine, at any point of time, its current position 112 with respect to a global coordinate system (e.g., a coordinate system for Earth 114). Moveable object 110 is equipped with a satellite receiver (navigation signal receiver 120), typically including or coupled to one or more satellite antennas 140, to receive satellite navigation signals from at least four satellites 115 that are orbiting Earth. The satellite navigation signals received by moveable object 110 are typically global navigation satellite system (GNSS) signals. Tables 1-2 below provides examples of GNSS signals from exemplary GNSS systems.

TABLE 1

| Signal Type | PRN Period (ms) | T Data/SC Period (ms) | PRN Length (chips) | Chipping Rate (MCPS) |
|---|---|---|---|---|
| GPS-C/A | 1 | 20 | 1023 | 1.023 |
| GPS-L1C | 10 | 10 | 10230 | 1.023 |
| BD-B1I | 1 | 1 | 2046 | 2.046 |
| BD-B1C | 10 | 10 | 10230 | 1.023 |
| GAL-E1B | 4 | 4 | 4092 | 1.023 |
| GAL-E1C | 4 | 1 | 4092 | 1.023 |
| GLN-G1C | 1 | 10 | 511 | 0.511 |

TABLE 2

| Signal Type | Modulation Type | Req Fs (MHz) | Min Length (ms) |
|---|---|---|---|
| GPS-C/A | BPSK | 2.046 | 2 |
| GPS-L1C | TMBOC(6,1,1/11) | 4.092 | 20 |
| BD-B1I | BPSK | 4.092 | 2 |
| BD-B1C | BOC(1,1) | 4.092 | 20 |
| GAL-E1B | CBOC(6,1) | 4.092 | 8 |
| GAL-E1C | CBOC(6,1)-c | 4.092 | 8 |
| GLN-G1C | BPSK | 4.092 | 2 |

In Tables 1-2 above, signal type refers to the various signals provided by the various GNSS systems (e.g., GPS-C/A is the GPS coarse acquisition signal), PRN period is the length of time for a complete instance of the PRN code (in milliseconds), T is the length of time, in milliseconds, over which a single bit of data is encoded (in milliseconds), and is also the minimum length of time between signal value transitions due to either secondary code (SC) modulation or data modulation or both, PRN length is the number of chips in a complete instance of the PRN code, and the chipping rate is the rate at which the chips are transmitted (in millions of chips per second (MCPS)). The rate at which the chips are transmitted may differ from the rate at which they are received based on, e.g., the Doppler effect and other effects. The minimum length, in milliseconds, shown in Table 2 is the minimum amount of sampled data needed, for each signal type, to ensure that the receiver can detect the beginning of a PRN sequence for that signal type. For signal types in which the minimum length is greater than the available sample buffer memory, the receiver uses an iterative technique, described in detail below, to locate the beginning of a PRN sequence, and thereby determine the phase of the signal received from a particular satellite.

Moveable object 110 also receives satellite orbit correction information and satellite clock correction information (sometimes collectively called "correction information") for the plurality of satellites. The correction information is typically broadcast by and received from one or more satellites 118 distinct from the GNSS satellites 115, using an antenna 142 and signal receiver 152 (see FIG. 2) distinct from antenna 140 and receiver 150 used to receive the satellite navigation signals. However, in some embodiments, the same antenna and receiver are used to receive both satellite navigation signals and correction information.

Moveable object 110 determines a position of moveable object 110, using the received satellite navigation signals and the received satellite orbit correction information and satellite clock correction information for the plurality of satellites. In some embodiments, received satellite navigation signals are processed by navigation signal receiver 120, including analog signal processing circuitry 122 and a digital signal processor 124, taking into account the correction information, to determine code measurements and phase measurements for signals received from four or more satellites 115. Embedded computer system 130 determines the position of moveable object 110 based on those measurements.

Figure 2:
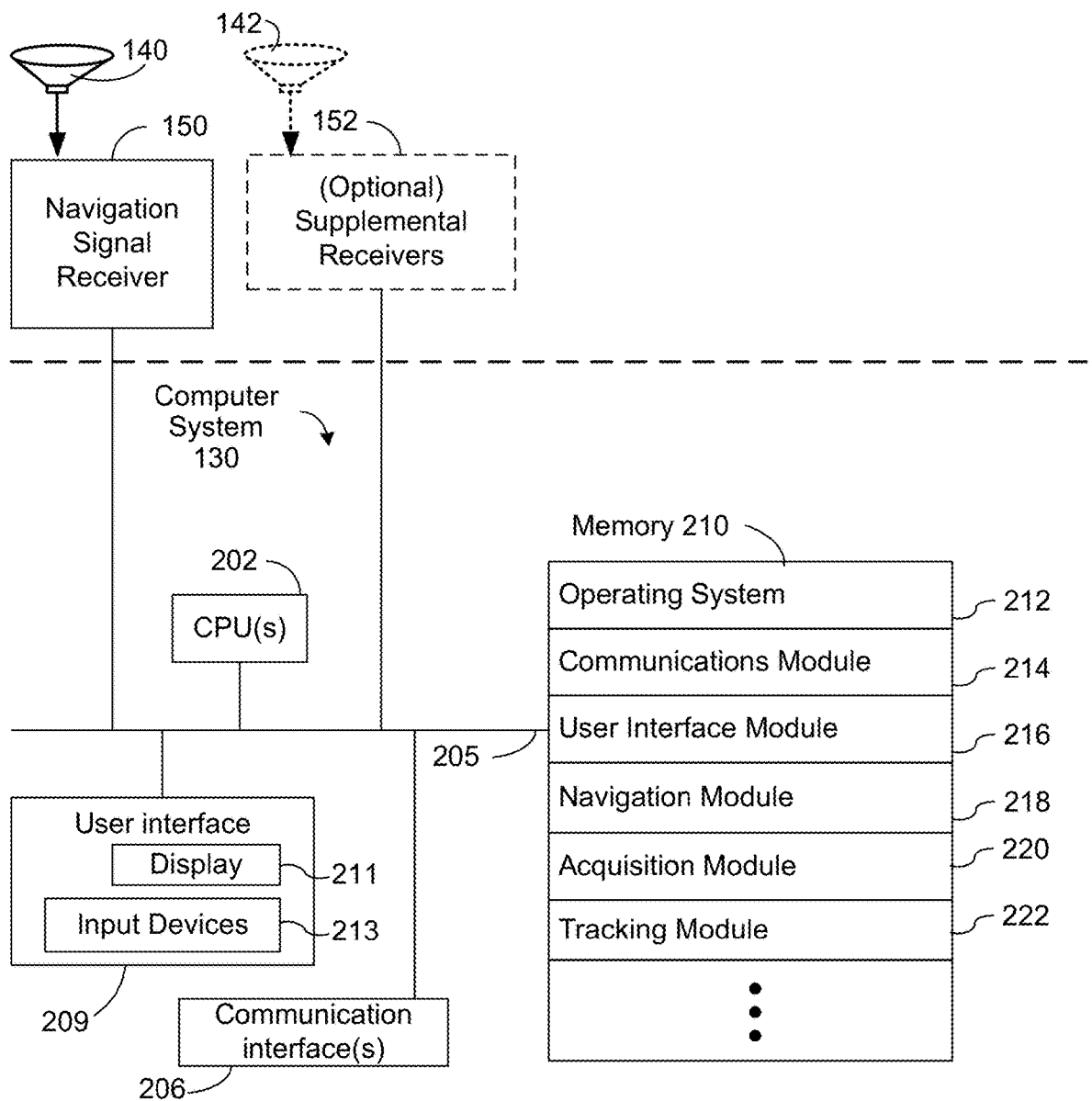
FIG. 2 is a block diagram of a computer system, such as a computer system that is part of a moveable object's navigation system, according to some embodiments.

FIG. 2 is a block diagram of computer system 130 in, and used by, a moveable object to determine the position of the moveable object, according to some embodiments.

Computer system 130 typically includes one or more processors (sometimes called CPUs, hardware processors) 202 for executing programs or instructions; memory 210; one or more communications interfaces 206; and one or more communication buses 205 for interconnecting these components. Computer system 130 optionally includes a user interface 209 comprising a display device 211 and one or more input devices 213 (e.g., one or more of a keyboard, mouse, touch screen, keypad, etc.) coupled to other components of computer system 130 by the one or more communication buses 205. Navigation signal receiver 150, and supplemental receiver(s) 152, if provided, are also coupled to other components of computer system 130 by the one or more communication buses 205. The one or more communication buses 205 may include circuitry (sometimes called a chipset) that interconnects and controls communications between system components.

Communication interface 206 (e.g., a receiver or transceiver) is used by computer system 130, and more generally moveable object 110, to convey information to external systems, and to receive communications from external systems.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a computer readable storage medium. In some embodiments, memory 210 or the computer readable storage medium of memory 210 stores the following programs, modules and data structures, or a subset thereof:
- an operating system 212 that includes procedures for handling various basic system services and for performing hardware dependent tasks;
- a communications module 214 that operates in conjunction with communication interface 206 (e.g., a receiver and/or transceiver) to handle communications between moveable object 110 and external systems 160 (FIG. 1); the connection between computer system 130 and external systems 160 may include a communication network 162, such as the internet or a public or proprietary wireless network;
- a user interface module 216 for receiving information from one or more input device 213 of user interface database 209, and to convey information to a user of moveable object 110 via one or more display or output devices 211;
- a navigation module 218 for determining a position of the moveable object;
- an acquisition engine 220 for acquiring satellite signals from GNSS satellites, including determining a tracking frequency and a code shift (sometimes called a code offset) for each of several respective GNSS satellites;
- a tracking module 222, sometimes called the satellite signal tracking module, which tracks GNSS satellite signals using acquisition information (e.g., the tracking frequency and code shift) handed over from the acquisition module 220. For example, in some embodiments, tracking module 222 samples (for use by the navigation module 218) a GNSS satellite signal using a tracking frequency and code shift determined by the acquisition module 220.

Operating system 212 and each of the above identified modules and applications correspond to a set of instructions for performing a function described above. The set of instructions can be executed by the one or more processors 202 of computer system 130. The above identified modules, applications or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 optionally stores additional modules and data structures not described above.

FIG. 2 is intended more as a functional description of the various features which may be present in a computer system 130 of a moveable object 110 than as a structural schematic of the embodiments described herein. In practice, and as recognized by those of ordinary skill in the art, items shown separately could be combined and some items could be separated. For example, some items shown separately in FIG. 2 could be combined into a single module or component, and single items could be implemented using two or more modules or components. The actual number of modules and components, and how features are allocated among them will vary from one implementation to another.

In addition, in some embodiments, some or all of the above-described functions may be implemented with hardware circuits (e.g., which may comprise graphics processors for efficiently performing discrete Fourier transforms (DFTs), field programmable gate arrays (FPGAs), application specific integrated circuits (ASICs), a "system on a chip" that includes processors and memory, or the like). To that end, in some embodiments, CPUs 202 include specialized hardware for performing these and other tasks. In some embodiments, these operations are performed by navigation signal receiver 150/152 rather than computer system 130.

Figure 3:
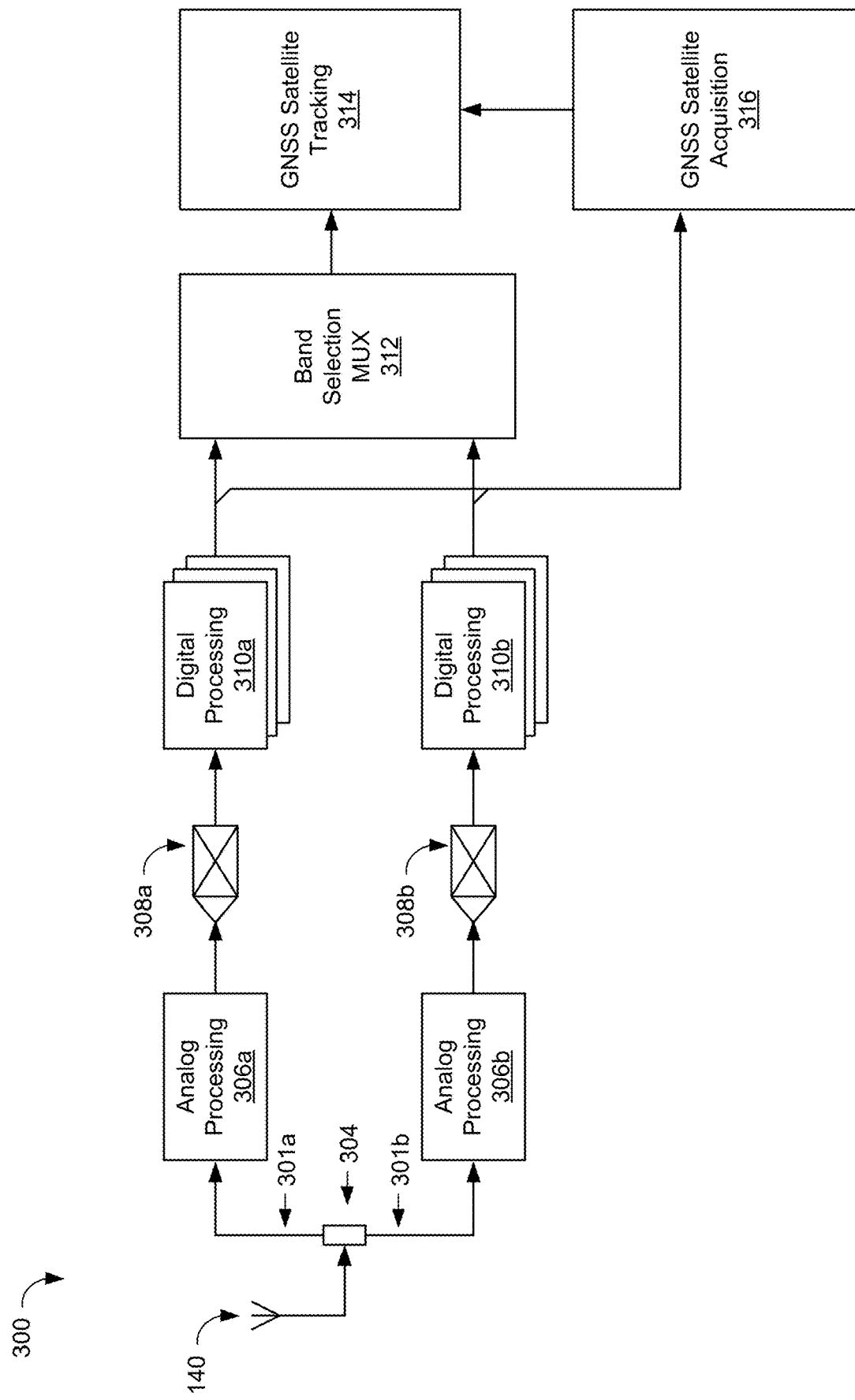
FIG. 3 is a block diagram of a GNSS receiver, in accordance with some embodiments.

FIG. 3 is a block diagram of a GNSS receiver 300, in accordance with some embodiments. An antenna 140 receives a GNSS signal from a satellite (e.g., satellite 115, FIG. 1). In some embodiments, antenna 140 receives a GNSS signal from each of a plurality of satellites (e.g., four or more satellites in a respective constellation of satellites). In some embodiments, antenna 140 receives a GNSS signal from a plurality of satellites from a plurality of different constellations (e.g., receives GPS signals, GLONASS signals, and/or BeiDou signals). Thus, in some embodiments, GNSS receiver 300 is a multi-constellation multi-frequency (MCMF) receiver. The signals received from antenna 140 are amplified by a low-noise amplifier 304 and passed to both a high frequency channel 301*a* and a low frequency channel 301*b*.

Channels 301*a* and 301*b* include analog processing circuitry 306*a* and 306*b*, respectively. In some embodiments, the analog processing circuitry 306*a* includes a high-band radio-frequency (RF) to intermediate-frequency (IF) analog chain, which may include one or more filters and a variable gain amplifier. In some embodiments, the analog processing circuitry 306*b* includes a low-band radio-frequency (RF) to intermediate-frequency (IF) analog chain, which may include one or more filters and a variable gain amplifier.

Channels 301a and 301b include analog to digital converters (ADC) 308a and 308b, respectively. In some embodiments, ADCs 308a and 308b sample the GNSS signal at a first sampling rate (e.g., 40.92 MHz). In some embodiments, the first sampling rate is a multiple (e.g., an integer multiple) of a chipping rate of the GNSS signal.

Channels 301a and 301b include digital processing circuitry 310a and 310b, respectively. In some embodiments, the digital processing circuitry 310a and 310b include digital band or sub-band selective filtering.

Channels 301a and 301b are passed to both a GNSS satellite tracking engine 314 (e.g., by way of band selection multiplexer (MUX) 312) and a GNSS satellite acquisition engine 316, which is described in detail below. For now, it suffices to say that the GNSS satellite acquisition engine 316 determines parameters needed by GNSS satellite tracking module 314 for tracking satellites, such as a code shift and a frequency (e.g., chipping frequency). Furthermore, pseudorange information (e.g., measurements of the distance between the receiver 300 and each satellite in a set of four or more satellites that are in view of the receiver 300) determined by the GNSS satellite tracking engine 314 is what is used to determine the location of the receiver 300.

Figure 4:
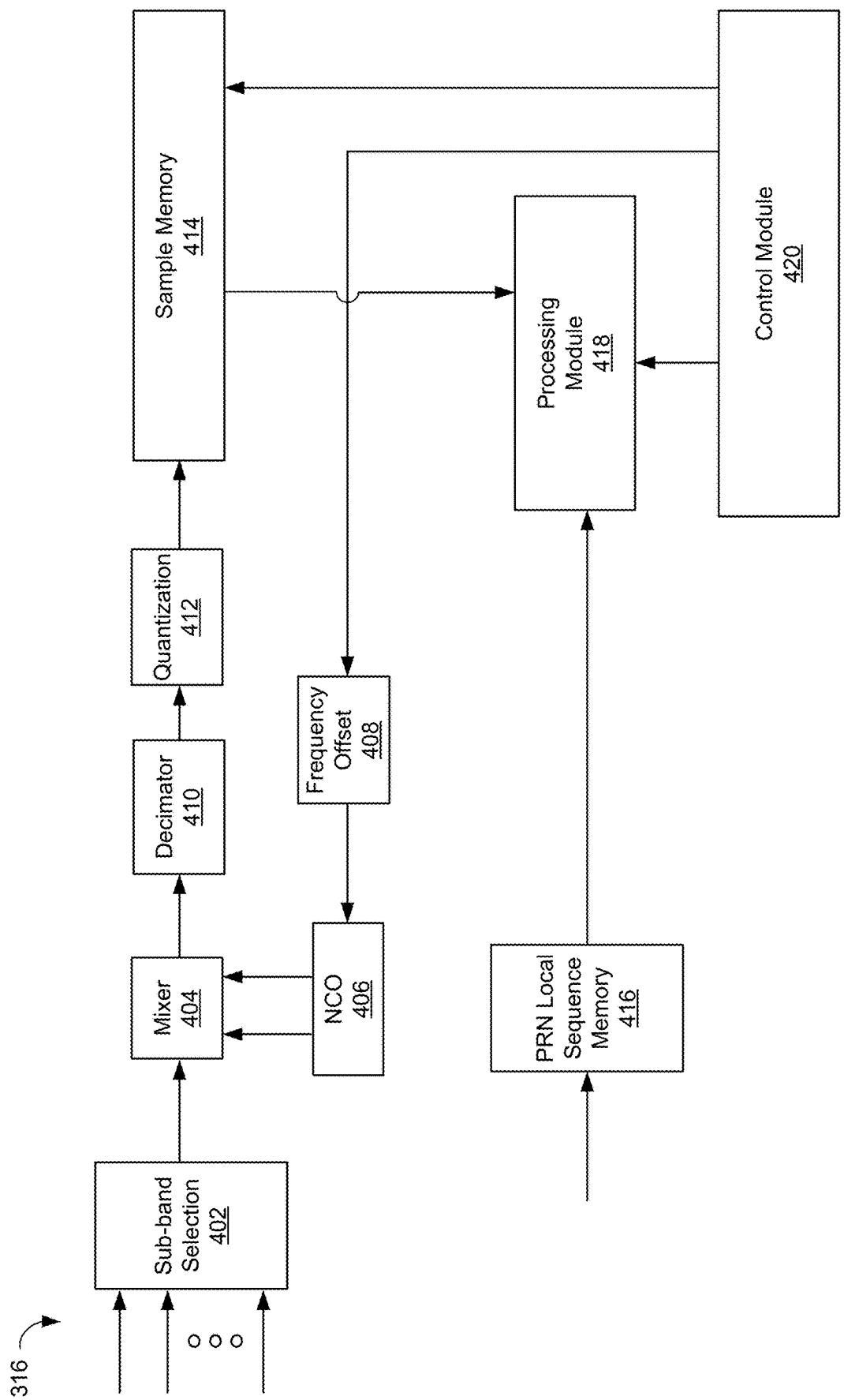
FIG. 4 is a block diagram of an acquisition engine in a GNSS receiver, in accordance with some embodiments.

FIG. 4 is a block diagram of an acquisition engine 316 in a GNSS receiver, in accordance with some embodiments. In some embodiments, the acquisition engine 316 includes the sub-components described below.

A sub-band selection module 402 selects the digital signal from the band corresponding to a satellite signal that the acquisition engine 316 is attempting to acquire.

A mixer 404 down converts the signal to a baseband frequency (e.g., removes a carrier signal). In some circumstances, the baseband signal produced by the mixer 404 is referred to herein as an "initially sampled signal" and comprises a digital signal sampled at the first sampling rate, described above (e.g., roughly 40 MHz).

A numerically controlled oscillator (NCO) 406 provides an intermediate frequency signal to mixer 404 so that mixer 404 can down convert the signal to the baseband frequency (e.g., wipe the signal of the carrier frequency). In some embodiments, the NCO 406 is sufficiently tunable (e.g., using frequency offset module 408) to cover uncertainty in the satellite signal frequency (e.g., the inverse of the chipping rate) resulting from on-board oscillator errors and line-of-sight (LOS) movement (e.g., +/−10 KHz). In addition, some GNSS systems, such as GLONASS offset the frequencies of different satellite signals (e.g., GLONASS signals are offset from one another in intervals of approximately 500 KHz). In some embodiments, while performing a frequency search (e.g., as described with reference to method 1000, FIGS. 10A-10B), the frequency offset module 408 adjusts the frequency of the NCO 406 in predefined coarse frequency hypothesis steps, which may be controlled by a look-up table.

A frequency offset module 408 configures (e.g., sets) the frequency of the intermediate frequency signal produced by the NCO 406.

A decimator 410 decimates the initially sampled signal to produce a decimated signal at a decimated rate. For example, in some embodiments, decimator 410 discards 90% of the initially sampled signal (e.g., such that the decimated signal has an effective sampling rate of 4.092 MHz instead of the roughly 40 MHz). In some embodiments, the decimator 410 includes a low-pass filter (e.g., a finite impulse response (FIR) filter or an infinite impulse response (IIR) filter). Such filtering process mitigates aliasing noise caused by the decimation.

A quantization module 412 quantizes the decimated signal onto L-levels (e.g., where L is an integer). For example, quantization module 412 converts the decimated signal values to one of a predefined plurality of L-quantized values (e.g., when L=2, quantization module 412 converts the sampled signal (e.g., acquired signal samples) into decimated signal values, each having a 0 value or a 1 value; in another example, L=3, in which case quantization module 412 converts the acquired signal samples into decimated signal values, each having a value of 1, 0 or −1). Quantization module 412 thus reduces the amount of sample memory 414 required to store a portion of the sampled signal. It is noted that signal acquisition is less-sensitive to quantization errors than signal tracking.

A sample memory 414 stores a buffered portion of a decimated, sampled satellite signal (e.g., at least a portion of the decimated, quantized, sample signal received from one or more satellites). As described in greater detail below, in some embodiments, or some circumstances, the stored portion of the decimated quantized sample signal corresponds to less than an entire instance of the PRN code used by a particular satellite (e.g., or less than twice an entire instance of the PRN code for the satellite). In some embodiments, the sample memory 414 is sufficiently large to store twice the length of a medium-length PRN code (e.g., such as a PRN code from a Galileo E1B/E1C signal). The embodiments described below provide different ways of determining a code shift depending on whether the sample memory 414 has a size that is more than or less than twice the length of the PRN code of the satellite whose signal is being acquired (thus, depending on which type of satellite signal is being acquired).

A PRN local sequence memory 416 stores local copies (e.g., sometimes called replicas) of PRN codes for respective satellites or stores parameters needed to generate the PRN codes for the respective satellite. For example, the PRN local sequence memory stores PRN codes (or values needed to generate the PRN codes) for every satellite in every constellation for which acquisition engine 316 may attempt to acquire a satellite signal. In some embodiments, the stored (or generated) PRN codes are versions of the PRN codes corresponding to the decimated frequency (e.g., a GPS-CA signal, with a PRN length of 1023 chips and a chipping rate of 1.023 MHz will be 4092 values long with a decimated sampling rate of 4.092 MHz). In some embodiments, for reasons that will be clear when considering the correlation processes described below, PRN local sequence memory 416 stores (or generates) PRN codes with a length corresponding to half the size of the sample memory 414 (e.g., regardless of the actual length of an entire instance of the PRN code). The locally stored or generated PRN codes in memory 416 are in some cases, for long PRN codes (e.g., PRN codes with 10230 chips, transmitted over a period of 10 ms), shorter than the corresponding full PRN code used by a respective satellite.

A processing module 418 performs various operations described with reference to method 1000 (FIGS. 10A-10B) and/or method 1100 (FIGS. 11A-11D). For example, in some embodiments, the processing module 418 correlates the PRN code for a satellite, which is stored in the PRN local sequence memory, with the portion of the sampled signal in the sample memory 414, to determine a code shift (sometimes called a code offset) and frequency for the satellite.

A control module 420 controls these and other components.

In some embodiments, the sub-band selection processing module 402, mixer 404 and NCO 406 operate at a clock rate corresponding to the first sampling rate (e.g., roughly 40 MHz).

In some embodiments, the decimator 410, quantization module 412, and sample memory 414 operate at a clock rate corresponding to the decimated sampling rate (e.g., 4.092 MHz).

It should be noted that the buffered portion of the PRN code sampled from the satellite signal stored in sample memory 414 may include all manners of other information and noise, such as PRN codes from other satellites (e.g., besides the satellite being acquired) and one or more data signals for the satellite being acquired as well as data signals from other satellites. Thus, as used herein, the term "buffered portion of the PRN code sampled from the satellite signal" means a portion of a signal that includes the PRN code from the satellite signal.

In some embodiments, the decimated frequency depends on the PRN code chipping rate as well as the modulation type. In some embodiments, for BPSK modulation, the GNSS acquisition engine 316 identifies the code shift within ¼ of a chip, so the decimated frequency is at least twice the chipping rate. In some embodiments, when acquiring a satellite signal that uses BOC modulation, because the autocorrelation loss is significantly worse (e.g., 3 times worse than for BPSK modulation), a decimated frequency of four times of the chipping rate is employed.

Figure 5:
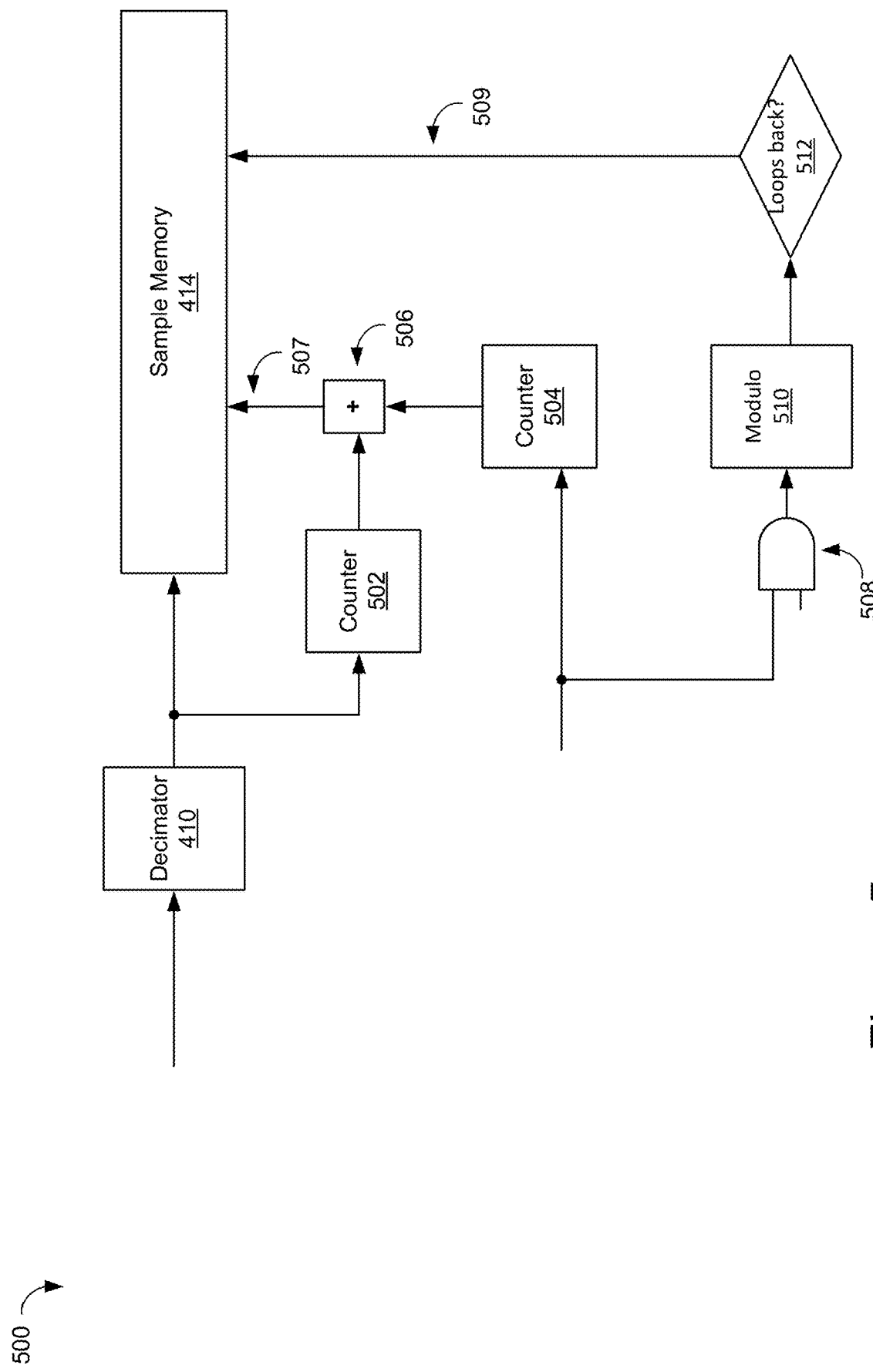
FIG. 5 is a block diagram of a sub-system of an acquisition engine for adding an offset to a buffered portion of a PRN code sampled from a satellite signal, in accordance with some embodiments.

FIG. 5 is a block diagram of a sub-system 500 of an acquisition engine for adding an offset to a buffered portion of a PRN code sampled from a satellite signal, in accordance with some embodiments.

As noted above, in some embodiments, and in some circumstances (e.g., depending on the GNSS signal being acquired), the sample memory 414 is large enough to test all of the possible code shift hypotheses without re-sampling and re-buffering the signal. For example, as long as the sample memory 414 is sufficiently large to store at least two full instances of the PRN code for the satellite being acquired, the PRN code is guaranteed to begin and end in the buffered portion.

However, storing two full instances of the PRN code can be impractical for satellite signals with long PRN codes. For example, the BeiDou B1C signal has a chip length of 10,230 chips and uses BOC modulation, implying the need for a long buffer if twice the PRN length (at the decimated sampling frequency) is to be stored. In such situations, it is often more practical to store a portion of the decimated signal that is less than twice the PRN length. Doing so means that, for the buffered portion of the signal, all of the selected code shift hypotheses may fail, in which case the signal is re-collected (e.g., re-sampled and re-buffered) with an offset (as compared to the initially buffered portion of the signal) and the code shift hypotheses are re-attempted.

Sub-system 500 provides a simple solution to sampling different portions of a satellite's PRN code across successive buffer shift iterations. To that end, for each buffer shift iteration, an offset is added to the buffered portion of the PRN code sampled from a satellite signal (e.g., and stored in sample memory 414). In some embodiments, the offset corresponds to an integer number of milliseconds as compared to the previously collected GNSS signal sample.

Sub-system 500 requires knowledge only of the period of an entire instance of the PRN code ($T_{PRN}$) of the signal being acquired and the length of the buffer. Given those two parameters, sub-system 500 guarantees that a matchable portion of the sampled PRN code will be stored in the sample memory 414 within a reasonable number of maximum buffer shift iterations. For example, a sample memory 414 stores 8 ms of the sampled signal (e.g., at the decimated rate) will have a matchable portion of the PRN code within eight (indexing from 0 to 7) iterations for a BeiDou B1C or GPS L1C signal having a PRN code with 10,230 chips. Sub-system 500 is easy to implement in hardware (e.g., using an ASIC) and requires very little processing time. In some embodiments, when the maximum number of buffer shift iterations is exhausted without identifying a code shift, the GNSS satellite acquisition engine 316 (FIG. 3) moves to a different frequency hypothesis.

Sub-system 500 includes a counter 502 that keeps track of a phase of a decimated signal from decimator 410. In some embodiments, counter 502 is a sub-millisecond counter. For example, in some embodiments, counter 502 counts time steps (e.g., changes in phase) at the decimated rate, which satisfies the maximum chipping rate needed for any constellation for which GNSS satellite acquisition engine 316 may acquire a signal (e.g., BeiDou B1I has the fastest chipping rate, at 2.046 MHz of any currently implemented GNSS signal, and thus, in some embodiments, counter 502 counts time steps at a rate of 4.092 MHz).

Sub-system 500 includes a counter 504 (e.g., a second counter) that keeps track of a millisecond phase shift associated with processing time by the GNSS satellite acquisition system 316. In some embodiments, counter 504 is a millisecond counter that counts millisecond time shifts (e.g., has the effect of calculating a phase that is a ceiling function of the processing time for processing a PN sequence).

Sub-system 500 includes a summer 506 that adds the outputs of counter 502 and counter 504 and provides the result as an index 507 to the sample memory 414. The index 507, sometimes called the current buffer index, is equal to the value of counter 502 plus the value of counter 504, and indicates the address in the memory 414 at which sub-system 500 stores the current decimated sample (e.g., the sample memory 414 stores the current sample at the address defined by the index 507).

When the GNSS receiver 300 is being used to acquire navigation signals having a minimum length (see Table 2), equal to two entire PRN sequences, that is greater than the capacity of sample memory 214, receiver 300 performs multiple iterations of storing data samples in sample memory 414 and analyzing that data, until either two whole PRN sequences of the signal have been acquired and analyzed, or the phase of the signal has been determined. As a result, even navigation signals with long PRN sequences can be acquired using a fixed length sample memory that is smaller than the longest "minimum length" of sampled data that may be needed to detect the phase of the beginning of the PRN sequence in those signals.

In some embodiments, to avoid collecting signal samples from any of the portions of a PRN sequence that have already been collected and analyzed, without locating the beginning of the PRN sequence in the sampled signal, sub-system 500 checks for this condition using logic decision module 512, and, if the condition is met, the start of the new iteration of collecting signal samples is delayed by a predefined amount of time, such as one millisecond, which is equivalent to advancing the phase of the next data sampling iteration by that predefined amount of time (e.g., 1 millisecond) compared with a prior iteration. To that end, sub-system 500 includes a logic module 508 that enables a modulo counter 510 when the collection of signal samples (e.g., for a particular frequency hypothesis, as discussed below) is going to start. The modulo counter 510 measures the processing period in milliseconds against the PRN sequence period in milliseconds (e.g., determines the processing period modulo the PRN sequence period), the result of which is used by a decision unit 512 to decide whether to hold off the next collection of signal samples by the predefined amount of time (e.g., 1 millisecond). If the condition tested by decision unit 512 is met, the delay of the next signal samples collection by the predefined amount of time avoids collecting signal samples for a portion of the PRN sequence that has already been collected and analyzed. If the condition tested by decision unit 512 is not met, the PRN phase of the signal samples currently being produced by decimator 410 are different from that of the prior iteration(s), and therefore the storing of signal samples in sample memory 414 proceeds without first waiting for the predefined amount of time to elapse. In some embodiments, other mechanisms and methods are used to ensure that signal samples corresponding to all portions of a PRN sequence are buffered and analyzed, over multiple collection and analysis iterations, when processing satellite signals whose PRN sequences are sufficient long that signal samples for two entire PRN sequences cannot all be stored in the sample memory at the same time.

Figure 6:
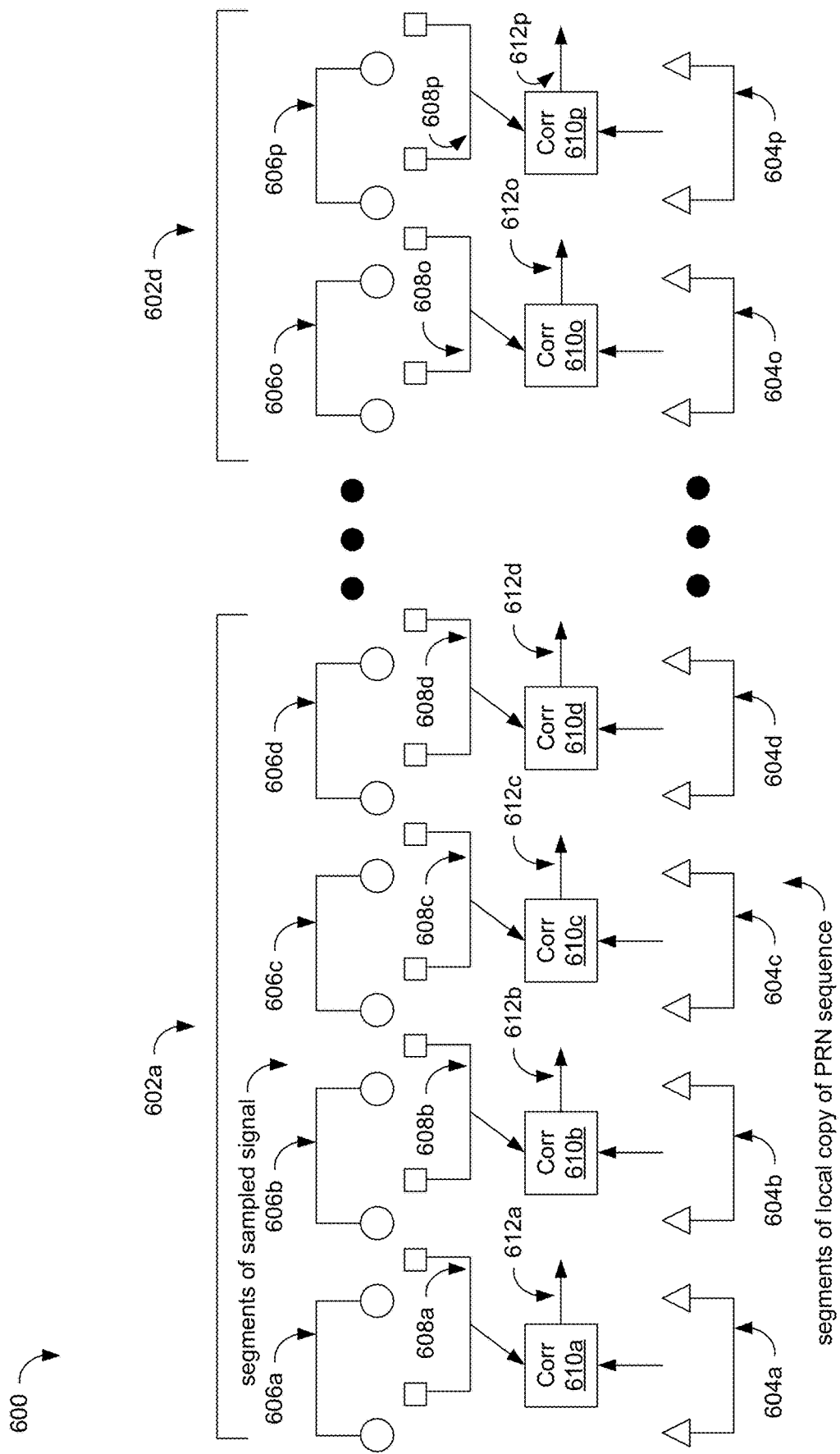
FIG. 6 is a schematic diagram of a process for correlating a plurality of segments of samples of a GNSS signal from a satellite with a local copy of the pseudorandom code for the satellite, in accordance with some embodiments.

FIG. 6 is a schematic diagram of a process 600 for correlating a plurality of segments 606 of samples of a GNSS signal from a satellite with segments 604 (e.g., 604*a* to 604*p*) of a local copy of the pseudorandom code for the satellite (e.g., stored or generated by PRN local sequence memory 416), in accordance with some embodiments. Segments 604 are sometimes called code segments, PRN code segments, or PRN sequence segments, all of which have the same meaning. In process 600, for each of a plurality of time periods 602 (e.g., adjacent time periods 602*a* through 602*d*), a plurality of segments 604 of a local PRN sequence are correlated (e.g., using a correlator 610) with corresponding segments 606 at a first offset to result in a first set of correlations. Then second segments 608 of samples of the GNSS signal from the satellite, which are shifted by 1 sample with respect to the first segments 606, are correlated with the local replica segments 604 to generate a second set of correlations. Such shifting and correlating continues until the testing of a pre-defined hypothesis has been completed (e.g., segments 604 of the local PN sequence are correlated with the sampled signal 606 according to the code-shift hypothesis being tested).

In some embodiments, the local copy of the pseudorandom code for the satellite is half the length of the buffered portion of the PRN code sampled from the satellite signal (e.g., stored in sample memory 414), so that the local copy can be shifted up to half the buffer length. Note, however, that the local copy of the pseudorandom code for the satellite need not represent an entire instance of the pseudorandom code as, in some circumstances, an entire instance of the pseudorandom code is longer than the sample memory 414.

In some circumstances, the time periods 602 correspond to the shortest intervals at which a data signal or secondary code (e.g., on top of the PRN code) may change value (e.g., flip from a "0" value to a "1" value or from a "1" value to a "0" value). For example, with reference to Tables 1-2, each currently implemented GNSS system encodes data on an integer multiple of millisecond time periods (e.g., the data period for GPS-CA is 20 ms, the data period for GAL-E1B is 4 ms). Thus, without knowing the phase of the data signal, the best that can be said is that the data signal may change value at any millisecond boundary. The effect of the data signal changing value is to change the parity of the PRN code. Thus, in some embodiments, time periods 602 are chosen as milliseconds so that frequency and code-shift hypothesis testing can be performed without regard to the data pattern (e.g., by combining correlations from different time periods 602 using different possible data patterns, each of which is referred to herein as a "data hypothesis").

Thus, in some embodiments, the time periods are milliseconds (e.g., time period 602*a* is a millisecond, time period 602*b* (not shown) is a millisecond, time period 602*c* (not shown) is a millisecond, and time period 602*d* is a millisecond). In some embodiments, each of the plurality of segments 604 corresponds to a quarter of the time period 602 (e.g., when each time period 602 is a millisecond, each segment 604 corresponds to a quarter of a millisecond). Thus, a first code shift hypothesis results from the correlation between the first quarter millisecond segments 606 of the sampled signal with the corresponding local quarter millisecond segments 604 of the local copy of the PRN sequence; a second code shift hypothesis results from the correlation between the second quarter millisecond segments 608 of the sampled signal with the corresponding local quarter millisecond segment 604 of the local copy of the PRN sequence; etc.

In some embodiments, correlators 610*a* through 610*p* (of which correlators 610*a*-610*d* and 610*o*-610*p* are shown in FIG. 6) are physically embodied as the same correlator (e.g., the same hardware is used multiple times to compute correlation values 612*a* to 612*p*). In some embodiments, correlators 610*a* through 610*p* are physically embodied as a plurality of correlators (e.g., a set of correlators).

In some embodiments, correlating each segment 604 of the local copy of the PRN sequence (e.g., using a correlator 610) with the corresponding signal samples of the segments 606 at the first code shift (corresponding to a first code shift hypothesis) produces a first correlation value 612 for the first code shift hypothesis; correlating each segment 604 of the local copy of the PRN sequence with the signal samples at a second code shift, represented in FIG. 6 by segments 608 of the sampled data, produces a second correlation value 612 for the second code shift hypothesis; and similarly, correlations performed using third and fourth code shift hypotheses produce third and fourth correlation values 612. Thus, a plurality of correlation values 612 (e.g., 612*a* to 612*p*) is produced for each respective time period 602 (e.g., correlation values 612*a*-612*d* are produced for time period 602*a* from segments 604*a*-604*d*).

Figure 7:
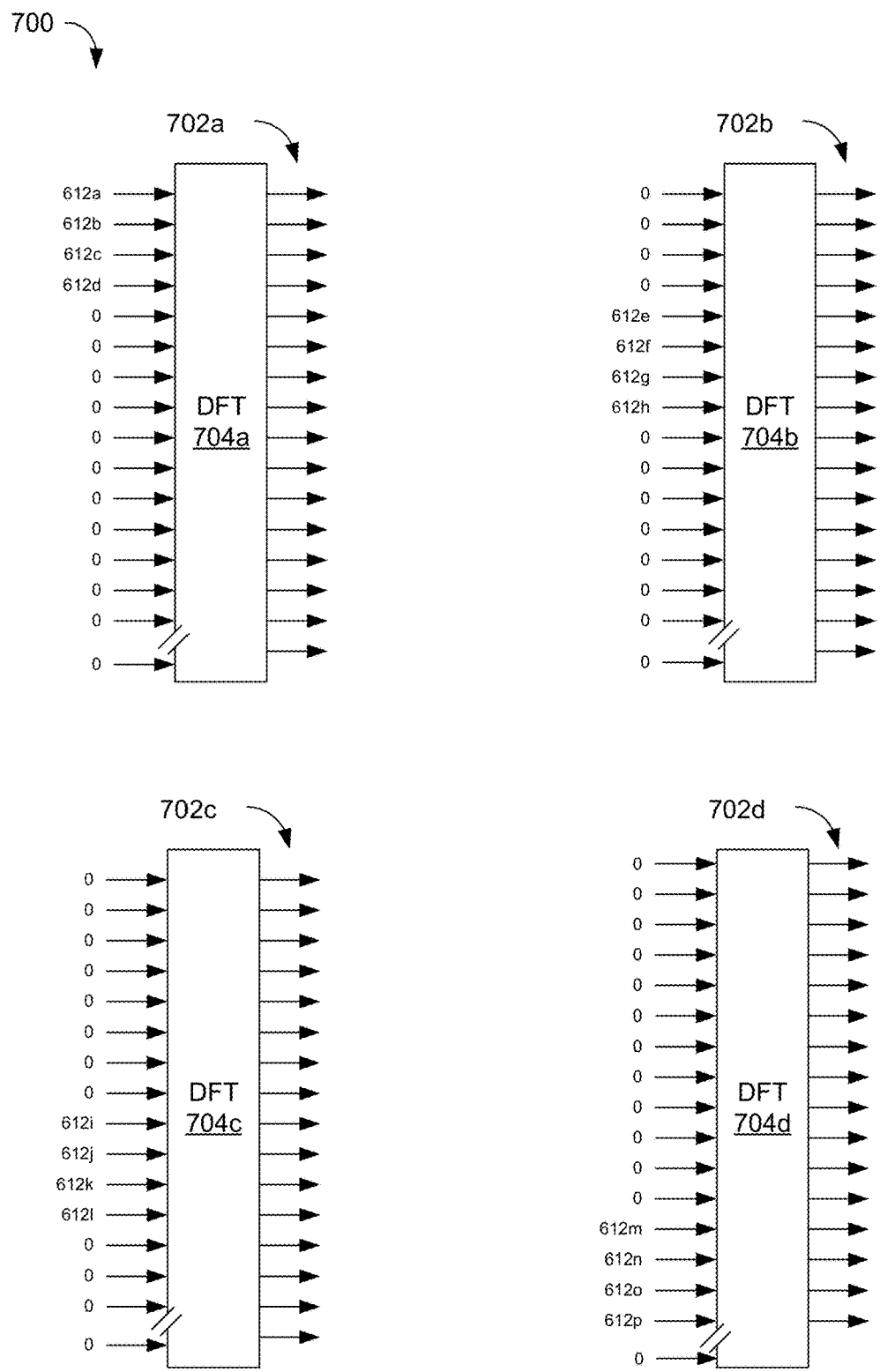
FIG. 7 is a schematic diagram of a process of performing separate discrete Fourier transforms (DFT) for different time periods of the GNSS signal from the satellite, in accordance with some embodiments.

FIG. 7 is a schematic diagram of a process 700 of performing separate discrete Fourier transforms (DFT) for the correlations 612 produced for different code shift hypothesis, described with reference to FIG. 6, in accordance with some embodiments. The DFT process 700 is used to produce a combined frequency representation of the GNSS signal from the separate DFTs. To that end, the separate DFTs for the individual time periods 602 (e.g., millisecond periods) are combined according to possible data pattern hypotheses and one of the resulting combined frequency representations is selected (based on predefined criteria) as the combined frequency representation (e.g., combined frequency representation 804, FIG. 8).

From the combined frequency representation of the GNSS signal, a tracking frequency for the GNSS signal is selected. It should be noted, however, that the DFT process 700 produces a frequency representation that covers a range of frequencies, and the tracking frequency may fall outside of that range of frequencies. To that end, in some embodiments, DFT process 700 is performed iteratively using a plurality of coarse frequency hypotheses (e.g., using 2 kHz coarse frequency steps). For example, for a currently selected code shift hypothesis, DFT process 700 is performed iteratively so as to cover all frequencies that could potentially be associated with the GNSS signal (e.g., for a particular satellite) that the receiver is attempting to acquire, and the strongest resulting combined frequency representation 804, for all those iterations, is then compared with predefined criteria to determine if the signal has, in fact, been acquired.

In the example shown in FIG. 7, each DFT calculation 704 has 32 inputs (of which just 16 are shown in FIG. 7, due to space constraints). Of those 32 inputs, four are correlation values produced for a corresponding time period, and the others are zero values.

In process 700, a first DFT calculation 704a is performed using the correlation values 612a-612d from a first time period 602a (e.g., as inputs) to produce a frequency representation 702a of the correlation values 612a-612d for the first time period 602a; a second DFT calculation 704b is performed using the correlation values 612e-612h from a second time period 602b (e.g., adjacent to and later than the first time period 602a) to produce a frequency representation 702b of the correlation values 612e-612h for the second time period 602b (e.g., correlation values 612e-612h are shifted by 4 inputs with respect to DFT calculation 704a); a third DFT calculation 704c is performed using the correlation values 612i-612l from a third time period 602c (e.g., adjacent to and later than the second time period 602b) to produce a frequency representation 702c of the correlation values 612i-612l for the third time period 602c (e.g., correlation values 612l-612i are shifted by 4 inputs with respect to DFT calculation 704b); and a fourth DFT calculation 704d is performed using the correlation values 612m-612p from a third time period 602d (e.g., adjacent to and later than the third time period 602c) to produce a frequency representation 702d of the correlation values 612m-612p for the third time period 602d (e.g., correlation values 612m-612p are shifted by 4 inputs with respect to DFT calculation 704c).

Note that, although the DFT calculations 704 are performed separately, in some embodiments, the DFT calculations are performed by the same hardware (e.g., performed serially). In some embodiments, the DFT calculation 704 is performed by separate hardware (e.g., performed in parallel). As also, in some embodiments, to refine the frequency resolution, additional zero inputs are provided to the DFT calculations 704 to further reduce the frequency uncertainty of the frequency representations 702 produced.

Further, some of the characteristics of the DFT calculations bear mentioning, in particular the number of inputs used for the DFT calculation and the temporal length of the segments 604 (FIG. 6) that are used to generate the correlation values 612. As noted above, the GNSS acquisition engines described herein use only coarse frequency steps for testing frequency hypotheses. For example, in some embodiments, NCO 406 shifts adjacent frequency hypotheses by 2 kHz steps. The goal of the acquisition engine 316 (FIGS. 3-4) is to hand off a tracking frequency that is within a tracking threshold of the tracking engine 314 (FIG. 3). For example, in some embodiments, the tracking engine 314 can track signals (e.g., through phase locking) if the tracking frequency provided by the acquisition engine 316 is within 62.5 Hz (125 Hz/2) of the frequency of the GNSS signal being received from the GNSS satellite whose signal is being acquired.

In some embodiments, the range of frequencies covered by the DFT calculations 704 is equal to the inverse of a quarter millisecond, 4 kHz. In embodiments in which a 32 point DFT is used, the frequency uncertainty is half of the frequency bin size, measured in Hz, of 4000 Hz/32=125 Hz. But the coarse frequency uncertainty of 2 kHz is 4 dB. To mitigate the power degradation resulting from the coarse frequency uncertainty, the range of frequencies covered by the DFT calculations can be reduced to 2 kHz from 4 kHz, reducing the coarse frequency uncertainty by a factor of two, and resulting in a power degradation of 0.9 dB.

Note that, in an alternate approach, all of the correlation values 612a-612p are applied to the same DFT calculation 704 (e.g., as inputs). The various data hypotheses can be tested by repeating this DFT calculation according to different possible data hypotheses (e.g., by swapping the parities of certain inputs depending on the data hypothesis). However, because DFTs are a computationally expensive exercise, whereas linearly combining the outputs of DFTs is not, it is more efficient to perform separate DFTs for the different time periods 602 (e.g., and pad the remaining inputs of the DFT calculation 704 with zero values), then combined the frequency representations 602 according to the different possible data hypotheses.

Each point (e.g., each output point) of the frequency representations 702 corresponds to a "frequency bucket" having a frequency range equal to the range of frequencies covered by the DFT calculations 704 divided by the total number of points used by the DFT calculations 704. Moreover, the range of frequencies covered by each point of the frequency representations 702 should correspond to a frequency range that is no larger than the tracking threshold for the tracking engine 314. Thus, as one example, using quarter millisecond segments 604 in a 32-point DFT implies that each point in the frequency representations 702 corresponds to a 125 Hz "bucket," (frequency range) which is equal to the exemplary tracking threshold described above. In some embodiments, the DFT calculations 704 output magnitudes for half the frequency bins, e.g., the middle 16 bins of 32 bins, for which magnitudes could potentially be generated, and it is those magnitudes that are combined by the methodology shown in FIGS. 8 and 9A-9B.

A mathematical representation of the DFT calculations represented by DFT process 700 in FIG. 7 is as follows:

$$DFT(k) = \sum_{i=0}^{M-1} \hat{D}_{\lfloor i/M_0 \rfloor} \text{corr}(i) e^{-2\pi i k/M}$$

$$= \sum_{i=1}^{M_0-1} \hat{D}_{\lfloor i/M_0 \rfloor} \text{corr}(i) e^{-2\pi i k/M}$$

$$+ \sum_{i=M_0}^{2M_0-1} \hat{D}_{\lfloor i/M_0 \rfloor} \text{corr}(i) e^{-2\pi i k/M}$$

$$+ \ldots$$

$$+ \sum_{i=(R-1)M_0}^{RM_0-1} \hat{D}_{\lfloor i/M_0 \rfloor} \text{corr}(i) e^{-2\pi i k/M}$$

$$= DFT(k, \hat{D}_0) + DFT(k, \hat{D}_1) + \ldots + DFT(k, \hat{D}_{R-1}),$$

where:
k∈ [0, M−1] is the bin number for the DFT output value being computed;
M=2R/V is the number of DFT points (output bins), which is equal to the number of inputs to each DFT computation, including 1/V correlation values and M−1/V zero point values;

R is the length, in milliseconds of the sampled data being processed during each iteration of the sampling and analysis processing;

V is the number of code shift hypotheses to be tested per millisecond of sampled signal data;

$M_0=1/V$ is the number of correlation points per millisecond of sampled signal data;

corr(i) is the $i^{th}$ correlation value; for example, in the example in FIG. 6, there are four ($M_0=4$) correlation values 612 (e.g., 612a-612d) produced for each millisecond of sampled signal data; and $\hat{D}_{[i/M_0]}$ is the (unknown) data bit over the sub-millisecond (SubmS) period identified by the index i. The data bit's value is constant for each $M_0$ summation. As described elsewhere in this document, the DFT computation is performed so that the four DFT components for each output bin can be summed in accordance with each possible data pattern.

In some embodiments, such as the example shown in FIG. 7, we have chosen V=0.25, R=4, M=32, and $M_0=4$. The use of the zero point padded DFT technique described here reduces the frequency uncertainty to 250/R Hz (e.g., 62.5 Hz), thus reducing the sync loss to 0.9 dB. The equation shown above is for an M-point DFT that can be divided into R (e.g., 4) M-point DFTs that each have a small number of non-zero inputs. Since only a small portion of the inputs (e.g., 4 of every 32) inputs to the M-point DFTs are non-zero, the use of a discrete Fourier transform (DFT) to compute the frequency characteristics of the sampled signal is efficient and accurate within the required level of accuracy to enable successful transfer of the resulting phase and frequency information to the tracking module 222 of the receiver.

Figure 8:
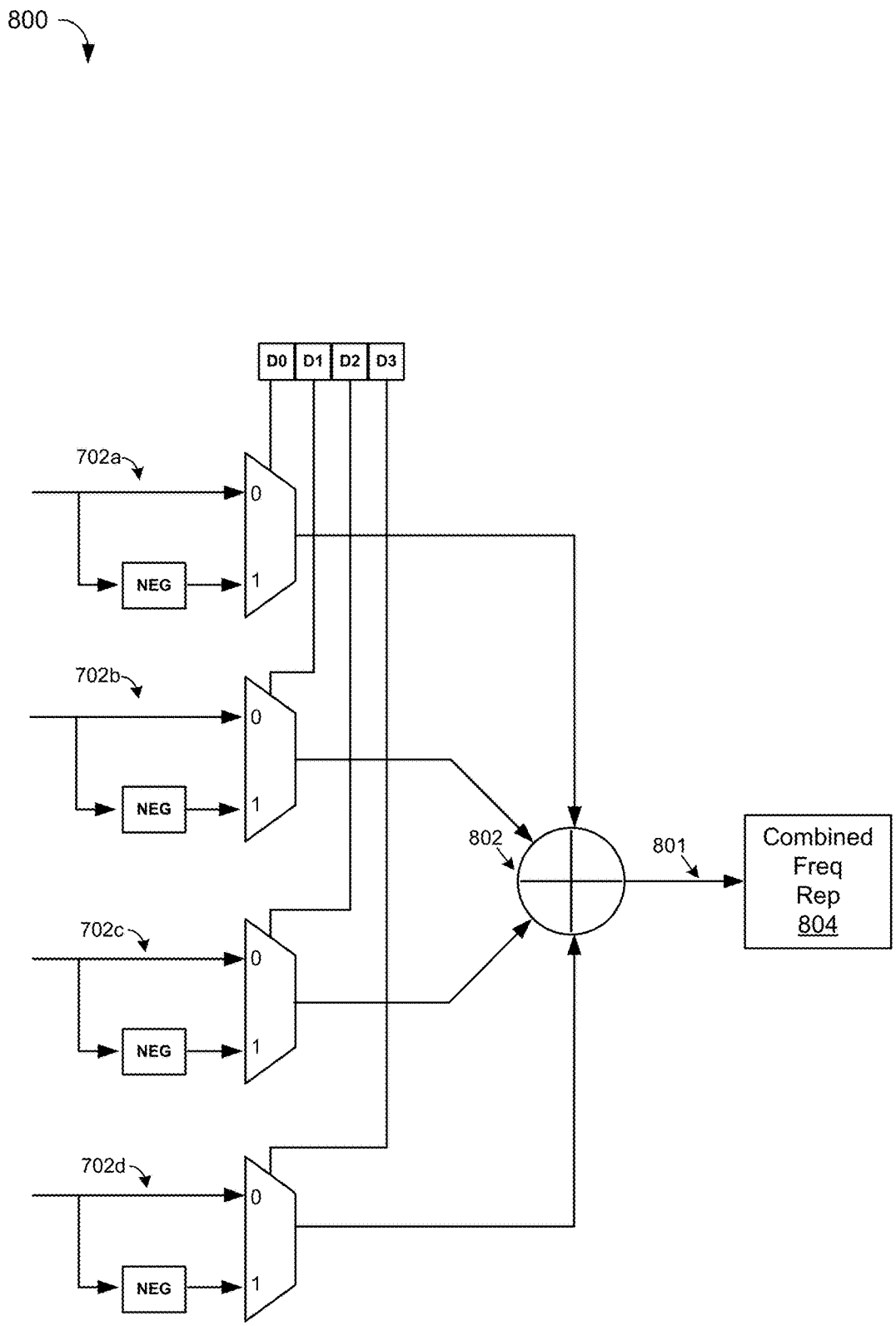
FIG. 8 is a schematic diagram of a sub-system for combining the DFT results for a plurality of time periods (e.g., PRN code periods) according to a data hypothesis, in accordance with some embodiments.
Figure 9A:
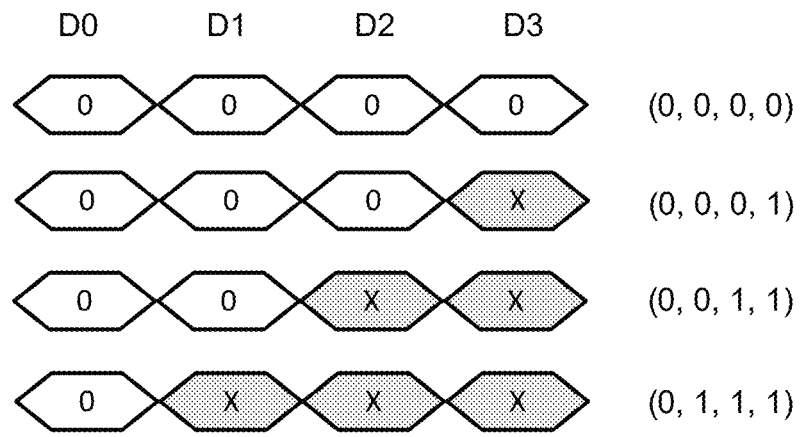
FIGS. 9A-9B illustrate examples of data hypotheses, in accordance with some embodiments.
Figure 9B:
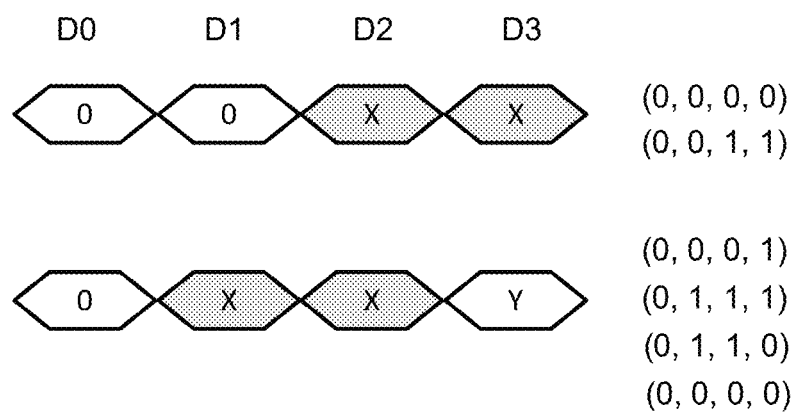

FIG. 8 and FIGS. 9A-9B are discussed together below. FIG. 8 is a schematic diagram of a sub-system 800 for combining the DFT results for a plurality of time periods (e.g., PRN code periods) according to a data hypothesis, in accordance with some embodiments. FIGS. 9A-9B illustrate examples of data hypotheses, in accordance with some embodiments. Sub-system 800 receives the frequency representations 702 (e.g., frequency representations 702a-702d, generated as described with reference to FIG. 7). For each received frequency representation 702, sub-system 800 passes either the frequency representation 702 (e.g., as-is) to a summing unit 802 or a negative of the frequency representation 702 (e.g., switches the parity of the frequency representation 702). Whether the sub-system 800 passes the frequency representation 702 or its negative depends on a data hypothesis being tested.

Examples of data hypotheses are shown in FIGS. 9A-9B. FIG. 9A illustrates possible data hypotheses for any GNSS signal with a data period longer than four of the time periods 602 described with reference to FIG. 6. For example, in some embodiments, each of the time periods 602 (FIG. 6) has a length of one millisecond. Thus, each of the frequency representations 702 (FIGS. 7-8) is generated using a millisecond of data. The data signal may transition (e.g., from a "1" value to a "0" value or a "0" value to a "1" value) after any one of those millisecond periods, but if the data period (e.g., for the GNSS signal being acquired by the receiver) is longer than four milliseconds, the data signal can only transition, at most, once over the four milliseconds represented by the four time periods 602a-602d. Because the magnitude of the combined frequency representation 804 is what matters, one can assume without loss of generality that the data value for the first millisecond is a "0" value. Thus, the four hypotheses to be tested are: no data transition, a data transition after the first millisecond, a data transition after the second millisecond, and a data transition after the third millisecond.

In some embodiments, each data hypothesis is tested to produce a candidate combined frequency representation 801. In some embodiments, the candidate combined frequency representation 801 with the highest magnitude is selected as the combined frequency representation 804.

FIG. 9B illustrates the possible data hypotheses for a GNSS signal with a data period shorter than four of the time periods 602 described with reference to FIG. 6. For example, the wide area augmentation system is a GNSS system with a data period equal to 2 milliseconds. In such cases, the data signal may transition not at all, once, or twice. In such cases, there are 5 data hypotheses to be tested, as shown in FIG. 9B (note that two of the six data hypotheses (potential sampled signal patterns) shown in FIG. 9B are the same, resulting in 5 distinct data hypotheses).

Figure 10B:
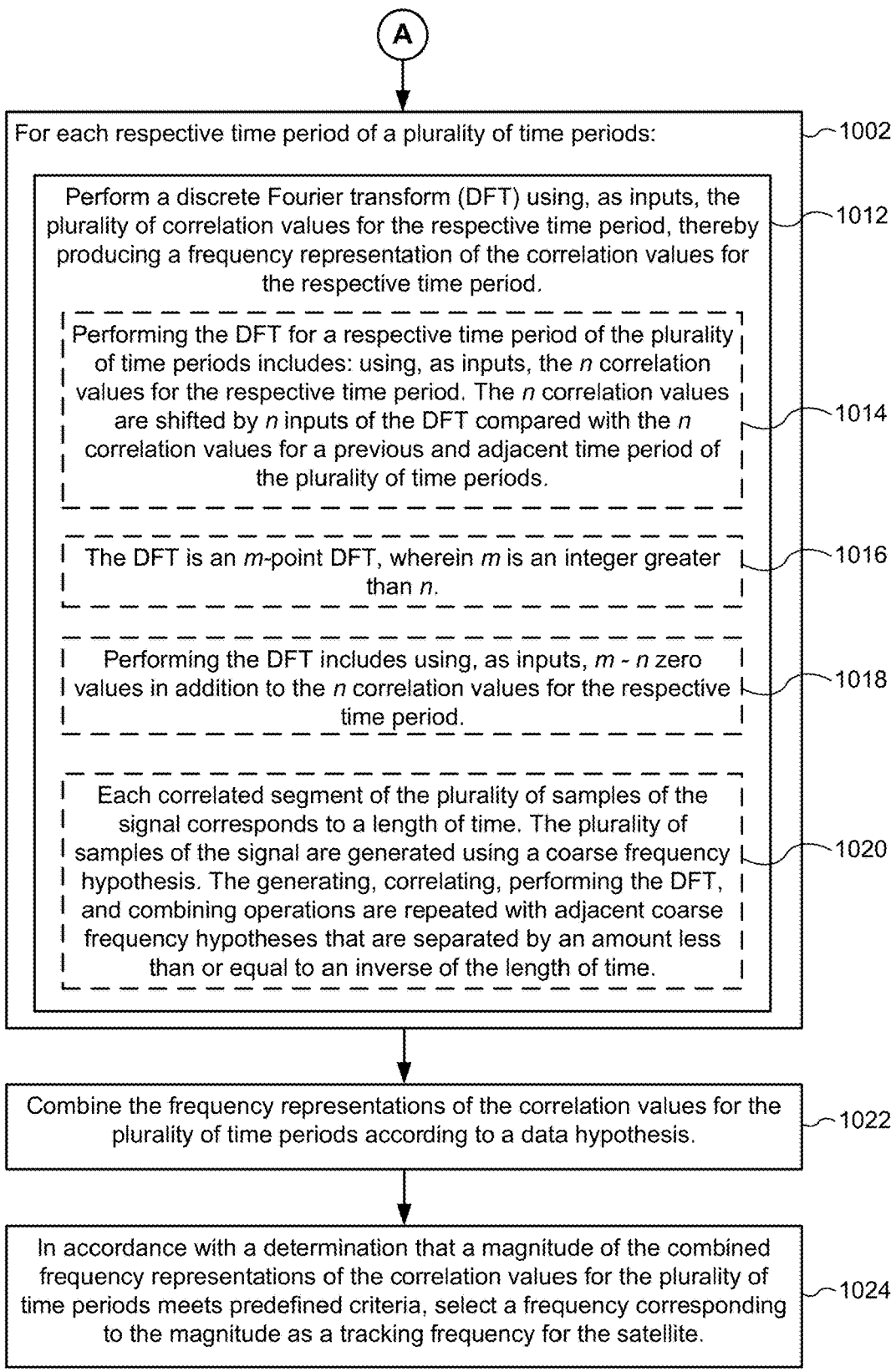
Figure 11A:
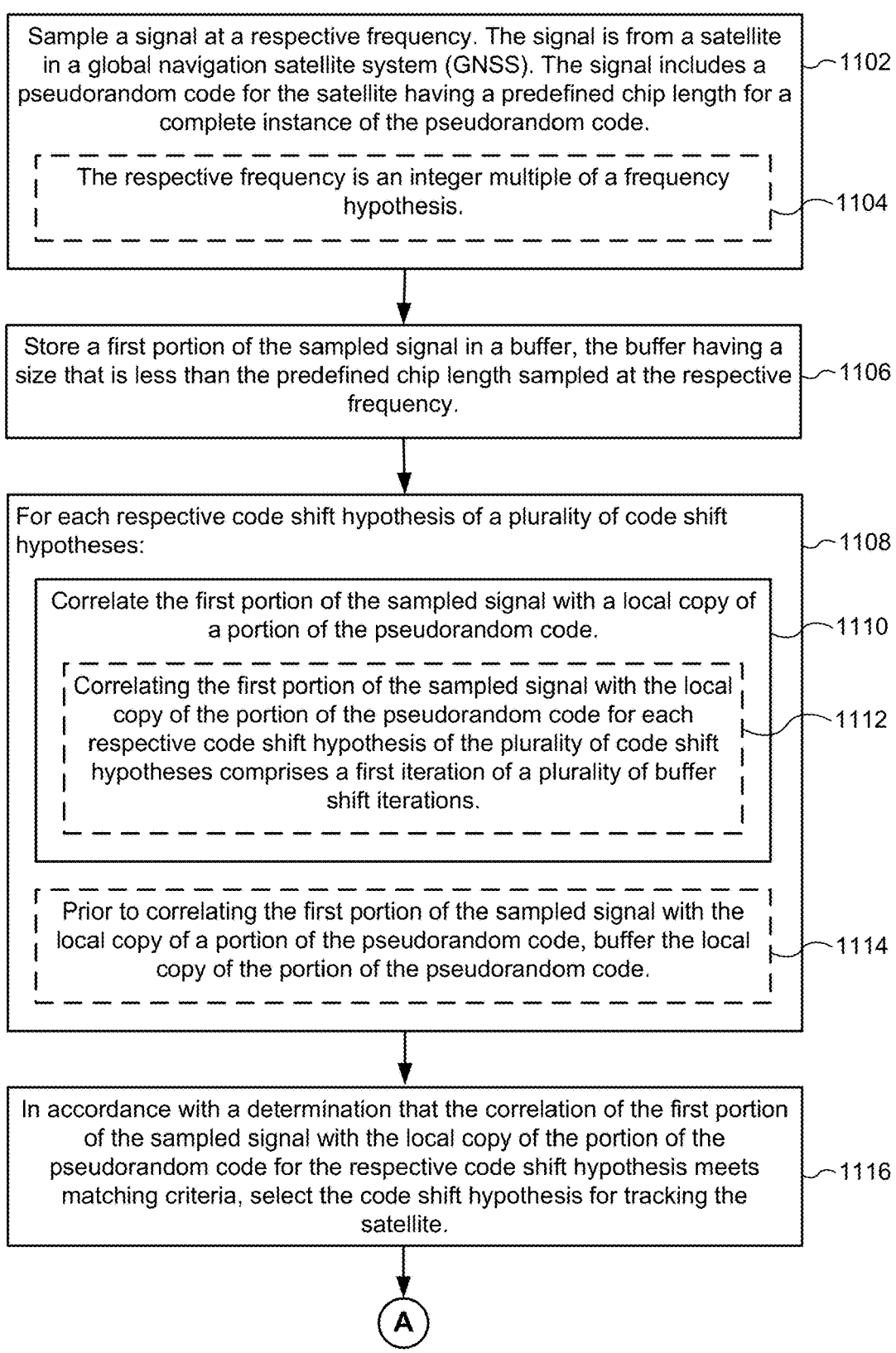
Figure 11B:
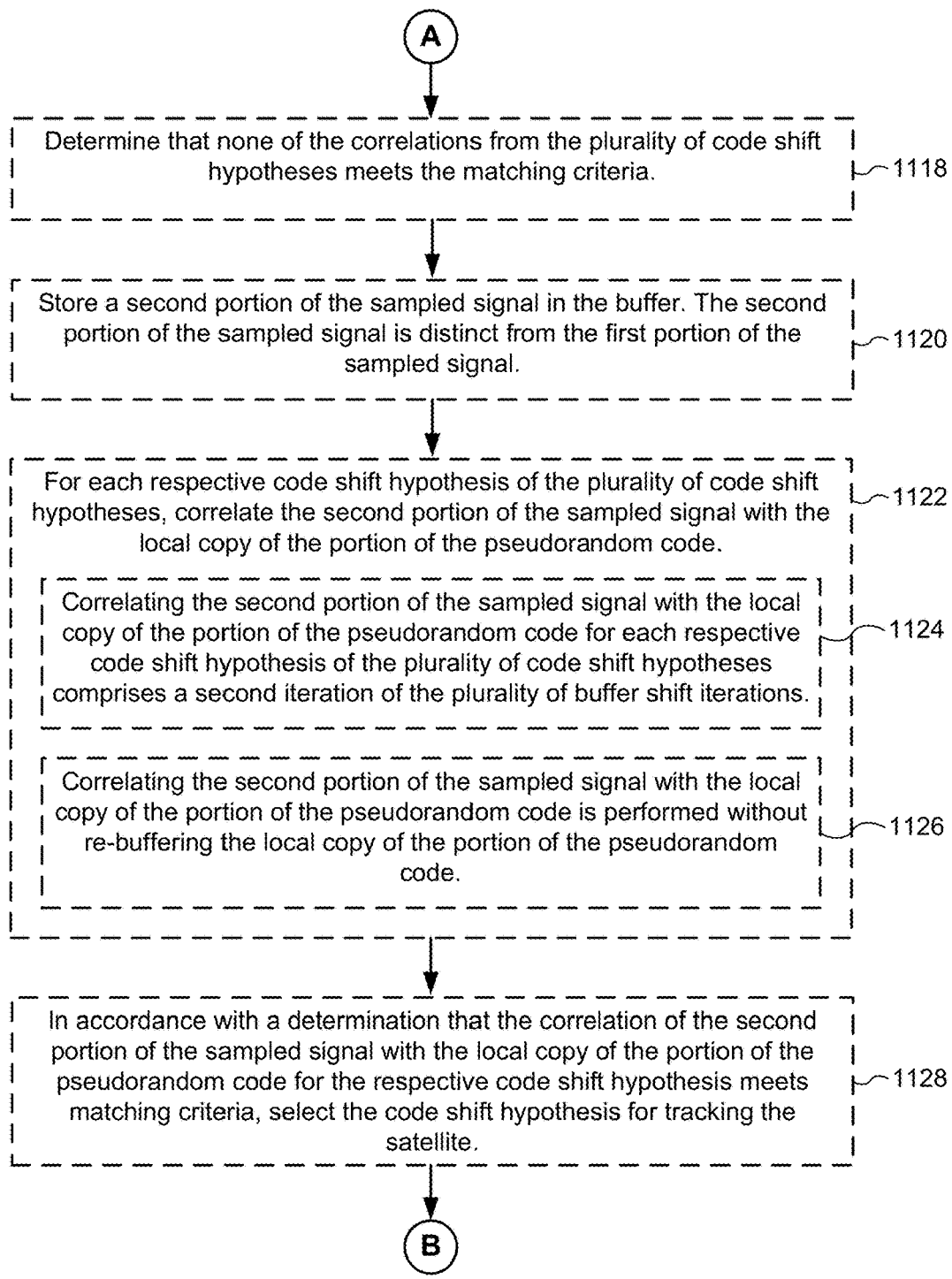
Figure 11C:
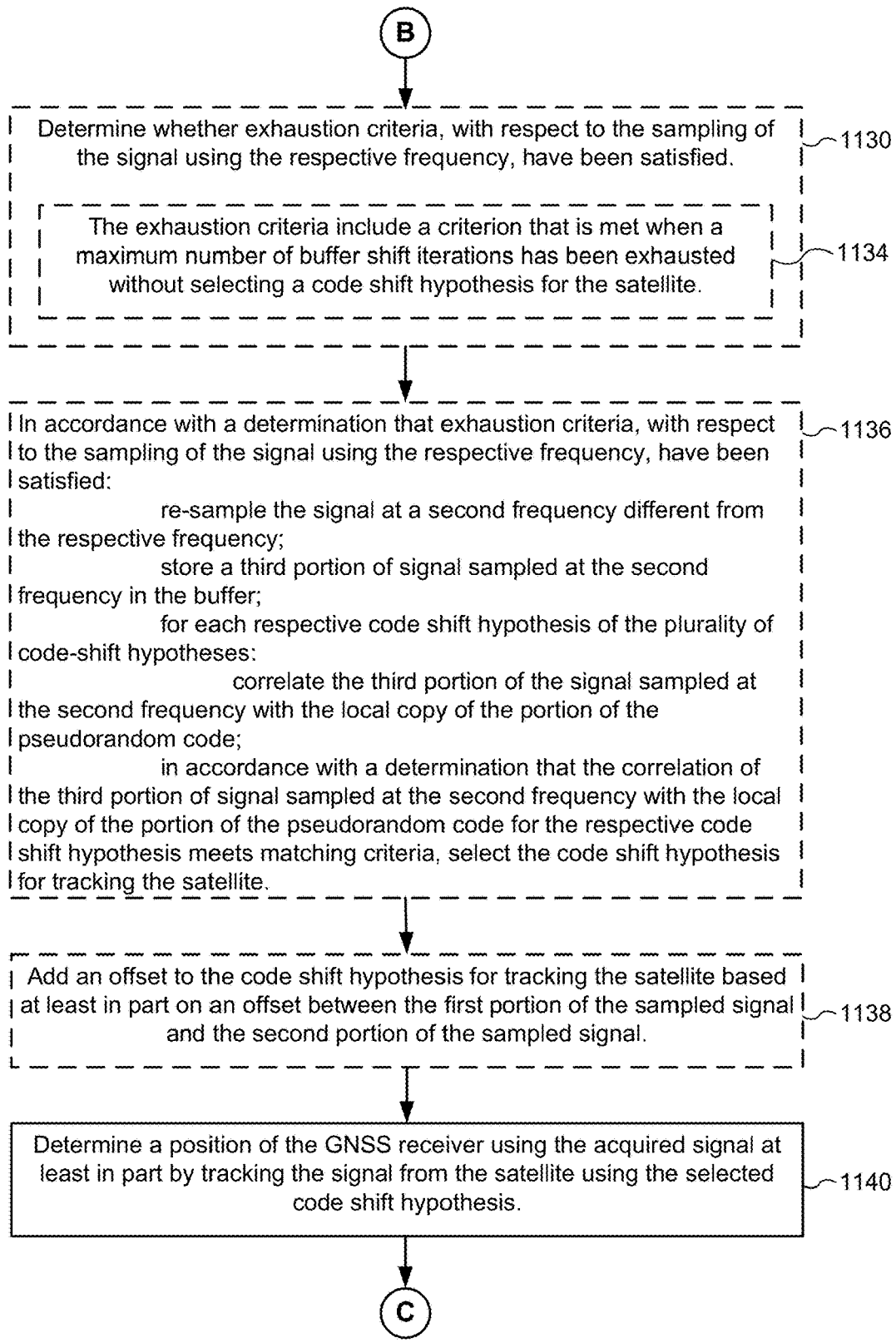

FIGS. 10A-10B illustrate a flow chart of a method 1000 of acquiring a signal from a satellite in a global navigation satellite system (GNSS), and more particularly, of acquiring a tracking frequency for the satellite, in accordance with some embodiments. Method 1000 is typically performed by a moveable object having circuitry, such as a signal receiver (e.g., receiver 120, FIG. 1) and one or more processors (e.g., one or more processors of computer system 130, FIG. 1), but optionally is performed, at least in part, by a system external to or remote from the moveable object. In some embodiments, method 1000 is performed by a GNSS signal acquisition engine (e.g., GNSS signal acquisition engine 316, FIG. 3) of a signal receiver on a mobile object. For ease of explanation, method 1000 will be explained as being performed by a moveable object, but it will be understood that at least some portions of method 1000 could be performed by an external system.

For each respective time period of a plurality of time periods (1002): the mobile object performs operations 1004, 1008, and 1012. In some embodiments, the time period is a period of a complete instance of the pseudorandom code. In some embodiments, operations 1004, 1008 and 1002 are performed for each of four consecutive time periods.

To that end, the mobile object generates (1004) a plurality of samples of a signal from a satellite in a global navigation satellite system (GNSS) (e.g., 8000 samples). The signal includes a pseudorandom code for the satellite. In some circumstances, the signal includes a data signal that provides a parity for the pseudorandom code (e.g., the data signal is modulated on top of the pseudorandom code). In some embodiments, the plurality of samples of the signal are generated using a coarse frequency hypothesis (e.g., adjacent coarse frequency hypotheses that are separated by 2 kHz steps).

In some embodiments, generating the plurality of samples of the signal includes: initially sampling (1006) the signal at an initial multiple of a coarse frequency hypothesis; and decimating the initially sampled signal to produce the plurality of samples of the signal. For example, in some embodiments, analog-to-digital converters 308 (FIG. 3) sample the signal at a rate of roughly 40.92 MHz, and decimator 410 discards 90% of the samples to produce a decimated signal with a sampling rate of 4.092 MHz. As discussed above, sample quantization can also be used to significantly reduce the required size of the sample memory 414.

The mobile object correlates (1008) a plurality of segments of the plurality of samples of the signal with a local copy of the pseudorandom code for the satellite, thereby producing a plurality of correlation values for the respective time period. In some embodiments, correlating the plurality of segments of the plurality of samples of the signal with the local copy of the pseudorandom code for the satellite for each respective time period of the plurality of time periods includes (1010) correlating n segments of the plurality of samples of the signal with the local copy of the pseudorandom code, wherein n is an integer greater than one (e.g., four segments of the plurality of samples for each time period are correlated with the local copy of the pseudorandom code, as described with reference to FIG. 6).

In some embodiments, each correlated segment of the plurality of samples of the signal corresponds to a length of time (e.g., 250 µs, e.g., a fraction of the time period such as ¼ the time period). In some embodiments, each segment corresponds to a quarter of the time period, such that four correlation values are produced for the respective time period (e.g., n=4). In some embodiments, the segments are continuous segments, each corresponding to a fraction of the time period. In some embodiments, the time periods are milliseconds (i.e., each time period has a duration of 1 millisecond, or approximately 1 millisecond).

In some embodiments, the mobile object performs (1012) a discrete Fourier transform (DFT) using, as inputs, the plurality of correlation values for the respective time period, thereby producing a frequency representation of the correlation values for the respective time period. For example, the discrete Fourier transform for each respective time period is performed separately from the discrete Fourier transform for each other respective time period (e.g., as described with reference to FIG. 7). In some embodiments, the discrete Fourier transform for each respective time period is performed by the same hardware as the Fourier transform for each other respective time period (e.g., in series). In some embodiments, the discrete Four transform for each respective time period is performed by different hardware from the Fourier transform for each other respective time period (e.g., in parallel).

In some embodiments, the mobile object repeats the generating, correlating, performing the DFT, and combining operations with adjacent coarse frequency hypotheses that are separated by an amount less than or equal to an inverse of the length of time of each segment. For example, the NCO 406 (FIG. 4) steps in 2 kHz steps, which is less than $1/250$ µs=4 kHz. In some embodiments, the generating, correlating, performing the discrete Fourier transform, and combining operations are performed for each of a plurality of coarse frequency hypotheses. In some embodiments, other than changing a coarse frequency hypothesis (e.g., in steps greater than or equal to 500 Hz, 1 kHz, 2 kHz, or 4 kHz), the sampling frequency is not modified. For example, using the method 1000 it is not necessary to perform fine frequency hypothesis testing in which frequency hypotheses are tested at increments within the tracking threshold (e.g., 125 Hz)

In some embodiments, performing the DFT for a respective time period of the plurality of time periods includes (1014): using, as inputs, the n correlation values for the respective time period. The n correlation values are shifted by n inputs of the DFT compared with the n correlation values for a previous and adjacent time period of the plurality of time periods. Take, as an example, an embodiment in which n=4. For the first time period, the four correlations are applied to the first four inputs of the DFT (e.g., as shown with reference to DFT calculation 704a, FIG. 7). The remainder of the DFT inputs are padded with zeroes (e.g., zero values are applied to the remaining inputs) and the DFT is run. For the next time period, the four correlations are applied to the fifth through eighth inputs of the DFT (e.g., as shown with reference to the DFT calculation 704b, FIG. 7). The remainder of the DFT inputs are padded with zeroes (e.g., zero values are applied to the remaining inputs) and the DFT is run.

In some embodiments, the DFT is (1016) an m-point DFT, wherein m is an integer greater than n. For example, as described with reference to FIG. 7, in some embodiments, the DFT is a 32-point DFT and four correlation values are used for each DFT calculation.

In some embodiments, performing the DFT includes (1018) using, as inputs, m–n zero values in addition to the n correlation values for the respective time period. For example, as described with reference to FIG. 7, in some embodiments, all of the inputs of a DFT calculation that are not provided a correlation value are provided a zero value.

In some embodiments, each correlated segment of the plurality of samples of the signal corresponds (1020) to a length of time (e.g., 250 µs, e.g., a fraction of the time period such as ¼ the time period). The plurality of samples of the signal are generated using a coarse frequency hypothesis. The generating, correlating, performing the DFT, and combining operations are repeated with adjacent coarse frequency hypotheses that are separated by an amount less than or equal to an inverse of the length of time. In some embodiments, an inverse of the length of time divided by m is less than or equal to a frequency tolerance for tracking the signal from the satellite using the tracking frequency. For example, a 250 µs correlation period corresponds to the DFT having a 4 kHz range ($1/250$ µs=4 kHz). Using a 32 point DFT implies that each point corresponds to a frequency range of 125 Hz, and thus an accuracy of ±62.5 Hz, which, in some embodiments, is within the frequency tolerance for tracking the signal from the satellite (e.g., using the tracking engine).

The mobile object combines (1022) the frequency representations of the correlation values for the plurality of time periods according to a data hypothesis (e.g., linearly combining the frequency representations, as described with reference to FIG. 8 and FIGS. 9A-9B). In some embodiments, combining the frequency representations of the correlation values for the plurality of time periods according to the data hypothesis includes summing the frequency representations of the correlation values with a parity applied according to the data hypothesis.

In accordance with a determination that a magnitude of the combined frequency representations of the correlation values for the plurality of time periods meets predefined criteria (e.g., the combined magnitude of the frequency bin having the maximum combined magnitude satisfies a predefined threshold), the mobile object (1024) selects a frequency corresponding to the magnitude as a tracking frequency for the satellite.

In some embodiments, the frequency representations of the correlation values are summed for each of the possible data hypotheses (e.g., the four or six data hypotheses shown in FIGS. 9A and 9B), and the combined frequency representation with the maximum magnitude (i.e., the largest combined magnitude for any of the frequency bins of the discrete Fourier transform) is selected, taking into account all the possible data hypotheses.

In some embodiments the correlating, performing the discrete Fourier transform, and combining operations described above are performed for each of a plurality of code shift hypotheses. For each code shift hypothesis, the maximum combine magnitude (e.g., combined frequency representation 804, FIG. 8) produced by operation 1022 replaces the previously computed combined maximum magnitude if it is larger than previously computed combined maximum magnitude for all previously considered code shift hypotheses (for the current frequency hypothesis).

In some embodiments, for a respective frequency hypothesis, the correlating, performing the discrete Fourier transform, and combining operations are performed for each of a plurality of satellites (e.g., without re-sampling the signal), by correlating the stored sampled data with a locally stored (or generated) replica of the PRN code (e.g., stored in PRN local sequence memory 416, FIG. 4) for each of those satellites. In some embodiments, the satellites are from different constellations. In this way, the satellite data sampled using one frequency hypothesis is tested against all applicable satellite PRN codes, and all code shifts of those satellite PRN codes, before the satellite data is resampled using a next frequency hypothesis. The entire acquisition process is then repeated for a next frequency hypothesis. In some embodiments, the acquisition process stops, prior to testing all the applicable frequency hypotheses, when the signals for a sufficient number of satellites (e.g., four or five satellites) have been acquired, and the corresponding information is provided to the tracking module 222. In some embodiments, the acquisition process runs until all applicable PRN codes have been tested for all applicable frequency hypotheses, thereby acquiring as many satellite signals as possible.

Similarly, in some embodiments, for a given PRN code hypothesis, once a code shift and frequency are identified that result in the combined frequency representations of the correlation values satisfying the predefined threshold (see discussion of step 1024 above), the signal for the corresponding satellite is considered to have been acquired, the frequency and code shift information for that satellite are passed to the tracking module 222, and all further testing of hypotheses for the PRN code corresponding to that satellite is halted. As a result, the amount of time required to complete the satellite signal acquisition process is reduced.

FIGS. 11A-11D illustrate a flow chart of a method of acquiring a signal from a satellite in a global navigation satellite system (GNSS), and more particularly, of acquiring a code shift for the satellite, in accordance with some embodiments. Method 1100 is typically performed by a moveable object having circuitry, such as a signal receiver (e.g., receiver 120, FIG. 1) and one or more processors (e.g., one or more processors of computer system 130, FIG. 1), but optionally is performed, at least in part, by a system external to or remote from the moveable object. In some embodiments, method 1100 is performed by a GNSS signal acquisition engine (e.g., GNSS signal acquisition engine 316, FIG. 3) of a signal receiver on a mobile object. For ease of explanation, method 1100 will be explained as being performed by a moveable object, but it will be understood that at least some portions of method 1100 could be performed by an external system.

The mobile object samples (1102) a signal at a respective frequency (e.g., 4.092 MHz, which may be a decimated frequency). The signal is from a satellite in a global navigation satellite system (GNSS). The signal includes a pseudorandom code for the satellite having a predefined chip length for a complete instance of the pseudorandom code.

In some embodiments, the respective frequency is (1104) an integer multiple of a frequency hypothesis (e.g., a frequency hypothesis for a chipping frequency of the signal). For example, in some embodiments, when the signal is BPSK encoded, the integer multiple is at least 2. In some embodiments, when the signal is BOC encoded, the integer multiple is at least 4.

The mobile object stores (1106) a first portion of the sampled signal in a buffer, the buffer having a size that is less than the predefined chip length sampled at the respective frequency. For example, when the signal is sampled at 4.092 MHz, and the pseudorandom code has a chip length of 10,230 chips sent at a frequency of 1.023 MHz, the whole pseudorandom code would have a length of 40,920 values. In some embodiments, the buffer stores fewer than 40,920 values (e.g., stores 32,736 values). In some embodiments, the buffer has a size that is less than the chip length for GPS-L1C and BeiDou B1C. In some embodiments, the buffer is less than twice (or four times) the predefined chip length sampled at the respective frequency.

For each respective code shift hypothesis (1108) of a plurality of code shift hypotheses, the mobile object performs at least operation 1110 and optionally operation 1114.

To that end, the mobile object correlates (1110) the first portion of the sampled signal with a local copy of a portion of the pseudorandom code (e.g., as described with reference to FIG. 6). In some embodiments, the plurality of code shift hypotheses correspond to offsetting the sampled signal, by offsets ranging from zero up to an offset corresponding to half the buffer length, with respect to the local copy of the PRN sequence. In some embodiments, correlating the first portion of the sampled signal with the local copy of the portion of the pseudorandom code for each respective code shift hypothesis of the plurality of code shift hypotheses comprises (1112) a first iteration of a plurality of buffer shift iterations.

For example, because in some embodiments the buffer has a size that is less than the predefined chip length sampled at the respective frequency, in some circumstances, the buffered portion of the satellite signal has to be recollected, with a phase to successfully detect a code shift. Each instance of the buffer being filled in this manner is considered a "buffer shift iteration."

In some embodiments, prior to correlating the first portion of the sampled signal with the local copy of a portion of the pseudorandom code, the mobile object buffers (1114) the local copy of the portion of the pseudorandom code. In some embodiments, the mobile object generates the local copy of the portion of the pseudorandom code.

In accordance with a determination that the correlation of the first portion of the sampled signal with the local copy of the portion of the pseudorandom code for the respective code shift hypothesis meets matching criteria, the mobile object selects (1116) the code shift hypothesis for tracking the satellite. For example, in some embodiments, the code shift hypothesis meets matching criteria when a value of the combined frequency representation 804 (FIG. 8) exceeds a threshold value (e.g., an absolute threshold value or a threshold value with respect to a calculated noise floor).

In some embodiments, the mobile object determines (1118) that none of the correlations from the plurality of code shift hypotheses meet the matching criteria. Thus, the mobile object performs a second buffer shift iteration. To that end, the mobile object stores (1120) a second portion of the sampled signal in the buffer (e.g., the signal is re-collected with a phase shift, as described with reference to FIG. 5). The second portion of the sampled signal is distinct from the first portion of the sampled signal (e.g., phase shifted). In some embodiments, for each respective code shift hypothesis of the plurality of code shift hypotheses, the mobile object correlates (1122) the second portion of the sampled signal with the local copy of the portion of the pseudorandom code.

As noted above, in some embodiments, correlating the second portion of the sampled signal with the local copy of the portion of the pseudorandom code for each respective code shift hypothesis of the plurality of code shift hypotheses comprises (1124) a second iteration of the plurality of buffer shift iterations.

In some embodiments, correlating the second portion of the sampled signal with the local copy of the portion of the pseudorandom code is performed (1126) without re-buffering (e.g., or re-generating) the local copy of the portion of the pseudorandom code.

In some embodiments, in accordance with a determination that the correlation of the second portion of the sampled signal with the local copy of the portion of the pseudorandom code for the respective code shift hypothesis meets matching criteria, the mobile object selects (1128) the code shift hypothesis for tracking the satellite.

In some embodiments, the mobile object determines (1130) whether exhaustion criteria, with respect to the sampling of the signal using the respective frequency, have been satisfied.

In some embodiments, the exhaustion criteria include (1134) a criterion that is met when a maximum number of buffer shift iterations has been exhausted without selecting a code shift hypothesis for the satellite (e.g., given the length of the buffer and the predefined chip length).

In some embodiments, in accordance with a determination that exhaustion criteria, with respect to the sampling of the signal using the respective frequency, have been satisfied, the mobile object repeats the process using a different frequency hypothesis. To that end, the mobile object: re-samples (1136) the signal at a second frequency different from the respective frequency (e.g., a second coarse frequency hypothesis); stores a third portion of signal sampled at the second frequency in the buffer; for each respective code shift hypothesis of the plurality of code-shift hypotheses: correlates the third portion of the signal sampled at the second frequency with the local copy of the portion of the pseudorandom code; and in accordance with a determination that the correlation of the third portion of signal sampled at the second frequency with the local copy of the portion of the pseudorandom code for the respective code shift hypothesis meets matching criteria, select the code shift hypothesis for tracking the satellite.

In some embodiments, the mobile object adds (1138) an offset to the code shift hypothesis for tracking the satellite based at least in part on an offset between the first portion of the sampled signal and the second portion of the sampled signal. In some embodiments, the offset is determined in accordance with the processing time.

The mobile object determines (1140) a position of the GNSS receiver using the acquired signal at least in part by tracking the signal from the satellite using the selected code shift hypothesis.

In some embodiments, the mobile object acquires (1142) a second signal from a second satellite in a second global navigation satellite system (GNSS) distinct from the global navigation satellite system. The second signal includes a second pseudorandom code for the second satellite having a second predefined chip length. The buffer has a size that is greater than the second predefined chip length sampled at the respective frequency. In some embodiments, the buffer has a size that is greater than twice (or four times) the second predefined chip length sampled at the respective frequency.

In some embodiments, for each respective code shift hypothesis of the plurality of code shift hypotheses, the mobile object: correlates (1144) the first portion of the sampled signal with a local copy of a portion of the second pseudorandom code; and in accordance with a determination that the correlation of the first portion of the sampled signal with the local copy of the portion of the second pseudorandom code for the respective code shift hypothesis meets the matching criteria, selects the code shift hypothesis for tracking the second satellite. In some embodiments, the plurality of code shift hypotheses corresponds to offsetting the sampled signal with respect to the local copy of the portion of the pseudorandom code using multiple successive offsets (e.g., successively larger (or smaller) offsets), up to an offset corresponding to half the buffer length. In some embodiments, when a code shift hypothesis is successful (e.g., when the matching criteria are met), the portion of pseudorandom code corresponds to a subset of the first portion of the pseudorandom code. In some embodiments, when a code shift hypothesis is successful, the portion of the pseudorandom code corresponds to a subset of the first portion of the pseudorandom code that starts in the first half of the buffer.

In some embodiments, the mobile object determines that none of the correlations from the plurality of code shift hypotheses meets the matching criteria (e.g., the first portion of the sampled signal does not correlate with the local copy of the portion of the pseudorandom code using any of the code shift hypotheses). The mobile object stores a second portion of sampled signal in the buffer. The second portion of the sampled signal is distinct from (e.g., shifted from) the first portion of the sampled signal (e.g., as described with reference to FIG. 5). For each respective code shift hypothesis of the plurality of code shift hypotheses, the mobile object correlates the second portion of the sampled signal with the local copy of a portion of the pseudorandom code and, in accordance with a determination that the correlation of the second portion of the sampled signal with the local copy of the portion of the pseudorandom code for the respective code shift hypothesis meets matching criteria, selects the code shift hypothesis for tracking the satellite (e.g., method 1100 is repeated with the second portion of the sampled signal in the buffer).

In some embodiments, an offset is added to the successful code shift hypothesis, and the satellite is tracked using the offset successful code shift hypothesis. For example, in some embodiments, an offset based on the processing time is added to the code shift hypothesis. In addition, in some embodiments, the method includes converting the successful code shift hypothesis to a higher frequency code shift hypothesis (e.g., a code shift hypothesis at the tracking frequency rather than the decimated sampling frequency that was used for acquiring the satellite.

Figure 12:
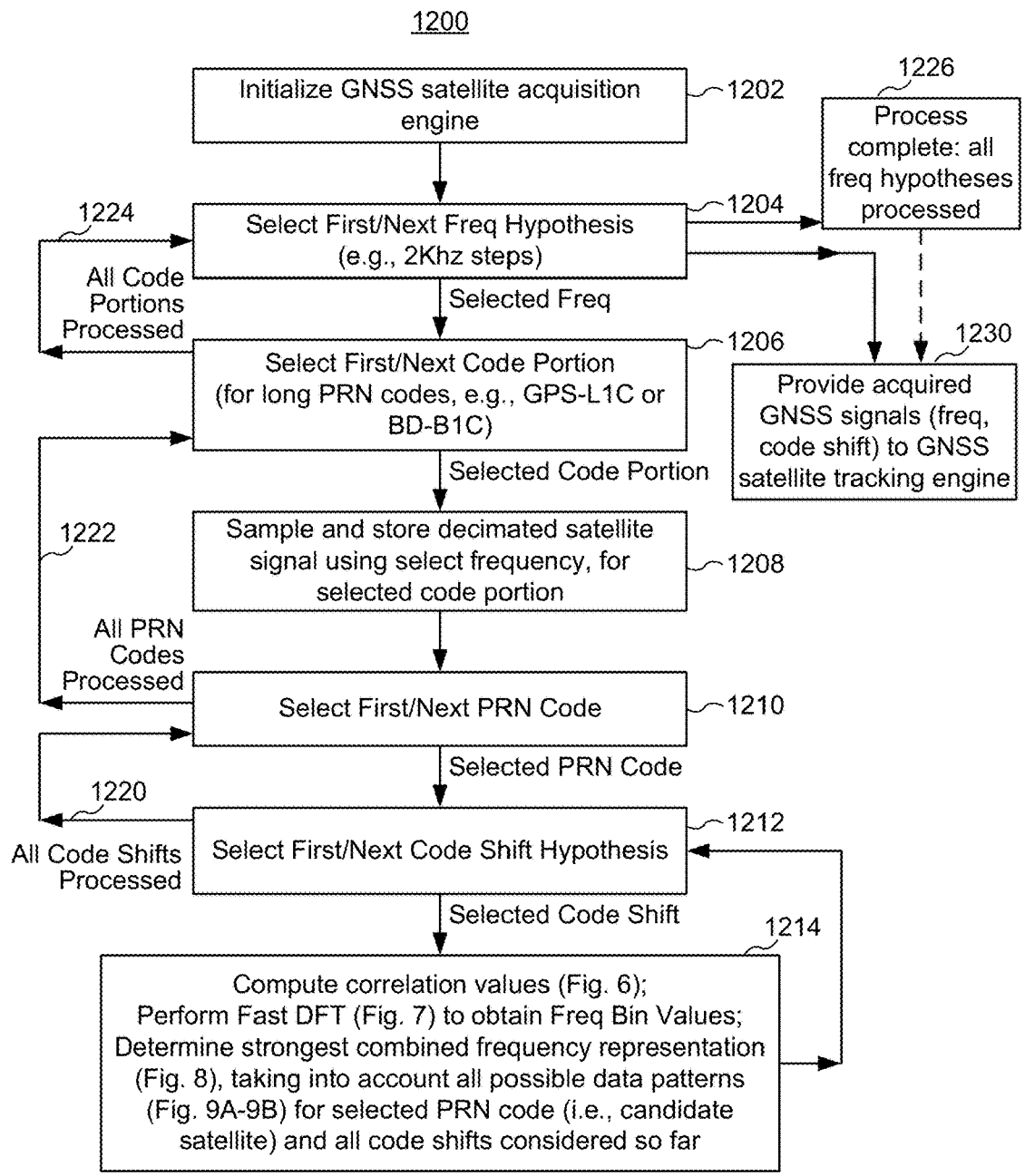
FIG. 12 illustrates a flow chart of a method of acquiring signals from one or more satellites in a global navigation satellite system (GNSS), and more particularly, of acquiring a tracking frequency and code shift for each of several satellites (e.g., for each satellite in view of the receiver), in accordance with some embodiments.

FIG. 12 illustrates a flowchart for a method 1200. In some embodiments, method 1200 is performed by a mobile receiver. In some embodiments, method 1200 is performed by the GNSS satellite acquisition engine of a mobile receiver. The flowchart indicates the order of certain operations used in method 1000, discussed above with respect to FIGS. 10A-10B, and method 1100, discussed above with respect to FIG. 11A-11D, in accordance with some embodiments. FIG. 12 includes four levels of nested computation loops, with the lowest level loop (1212-1214) for testing all code shift hypotheses (sometimes called code offset hypotheses) for a currently selected frequency (1204), currently selected PRN code (1210), and if applicable, currently selected portion of the sampled signal (e.g., for long PRN codes) (1206). Operation 1214 corresponds to the correlation, discrete Fourier transform (DFT) and data pattern analysis operations discussed above with reference to FIGS. 6, 7, 8 and 9A-9B. In some embodiments, operation 1214 is performed using specialized hardware, sometimes implemented in an ASIC, so as to enable that operation to be performed hundreds of thousands or even millions of times, for all potentially applicable frequency, PRN code and code shift hypotheses, within a predefined, short period of time, such as five seconds or less. As a result, the GNSS signals of all satellites, within a particular satellite constellation (e.g., GPS, or GLONASS) in view of a mobile receiver can be acquired within that predefined period of time.

Method 1200 begins with the GNSS satellite acquisition engine being initialized (1202), for example by loading a set of PRN codes in the PRN local sequence memory 415 (FIG. 4), setting the NCO 406 to a first frequency of the candidate frequencies, setting the code portion (if applicable) to a first code portion, and setting the code shift to an initial or first code shift (e.g., zero, corresponding to no offset or shift of the PRN sequence). At step 1204, a first or next frequency (sometimes called a frequency hypothesis) is selected. If step 1204 is reached after all frequency, PRN code and code shift hypotheses have been selected and analyzed, the GNSS satellite acquisition engine provides information (e.g., a frequency value and code shift) for a set of one or more, two or more, or more typically, four or more acquired GNSS signals to the receiver's GNSS satellite tracking engine (e.g., tracking module 222). Alternatively, in some embodiments, acquired GNSS signals are provided to the GNSS satellite tracking engine as they are acquired, as part of operations 1214, 1212, or 1210.

At step 1206, if the satellite constellation for which GNSS satellite acquisition is being performed has long PRN codes for which the GNSS satellite acquisition engine's sample memory (e.g., sample memory 414, FIG. 4) is insufficiently large to store samples for a full PRN period, a code portion is selected. For shorter PRN codes, there is only one code portion, comprising the entire PRN code, that code portion is "selected" be default; alternatively, step 1206 is skipped when acquiring GNSS signals having PRN codes that are short enough for the samples for a full PRN code to be stored in the sample memory (e.g., sample memory 414).

After performing step 1206, if applicable, or otherwise after step 1204, method 1200 progresses to step 1208. At step 1208, the received satellite signal is sampled using the selected frequency, decimated, and stored in the sample memory. If a code portion has been selected (1206), samples for the currently selected code portion are stored in the sample memory. Once samples are stored in the sample memory, those samples are processed or tested for all applicable PRN code hypotheses (1210) and code shift hypotheses (1212), so as to minimize the number of times that satellite data needs to be sample, decimated and stored in the sample memory. In particular, a first or next PRN code is selected at step 1210, and a first or next code shift is selected at step 1212, and then the sampled data is correlated (1214) with a local replica of the selected PRN code, at the selected code shift as described above with reference to FIG. 6, the correlation values are processed using a discrete Fourier transform, as described above with reference to FIG. 7, and the resulting frequency representations are combined in accordance with all potential data patterns, as described above with reference to FIGS. 8 and 9A-9B, to obtain or determine the strongest combined frequency representation for the currently selected PRN code and code shift (and code portion, if applicable). In some embodiments, the strongest combined frequency representation is checked at this point to determine if it meets predefine satellite signal acquisition criteria, and if so, that information is recorded and/or reported to the GNSS satellite tracking engine (e.g., immediately, or at step 1230).

Steps 1210, 1212 and 1214 are repeated until all PRN codes (1222) and code shifts (1220) applicable to the sampled data stored in the sample memory have been processed, after which method 1200 progresses to step 1206, for selection of a next cod portion if more than one code portion is to be processed, or to step 1204, at which a next frequency hypothesis is selected. In some embodiments, the repetition of steps 1210, 1212 and 1214 is stopped if a predefined number of satellite signals (e.g., four or five) have been acquired by the GNSS satellite acquisition engine, and the method instead progresses directly to step 1230, for reporting the acquired GNSS signals to the GNSS satellite tracking engine of the mobile receiver.

After steps 1210, 1212 and 1214 have been repeated until all PRN codes and code shifts applicable to the sampled data stored in the sample memory have been processed, method 1200 progresses to step 1206, if applicable, to select a next code portion, or otherwise to step 1204, to select a next frequency hypothesis. At step 1206, if all code portions have been processed (1224), method 1200 progresses to step 1204 to select a next frequency hypothesis. In addition, after the processing of a frequency hypothesis is completed, at step 1230, all GNSS signals acquired while processing that frequency hypothesis are reported (e.g., a frequency and code shift is reported for each acquired GNSS signal) to the GNSS satellite tracking engine of the mobile receiver. In some embodiments, satellites whose GNSS signals have been acquired during any of the frequency hypotheses already processed are switched by the receiver to tracking mode, using tracking module 222, without waiting for additional frequency hypotheses to be processed. In some other embodiments, GNSS signal acquisitions are reported to the tracking module 222 only after all frequency hypotheses have been processed (1226).

It will be understood that although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a global navigation satellite system (GNSS) receiver that includes one or more processors and instructions for execution by the one or more processors:
   acquiring a signal from a satellite in a global navigation satellite system (GNSS), wherein the signal includes encoded data and a pseudorandom code for the satellite, the acquiring including:
      for each respective time period of a plurality of time periods:
         generating a plurality of samples of the signal;
         correlating a plurality of segments of the plurality of samples of the signal with segments of a local copy of the pseudorandom code for the satellite, thereby producing a plurality of correlation values for the respective time period;
         performing a discrete Fourier transform (DFT) using, as inputs, the plurality of correlation values for the respective time period, thereby producing a frequency representation of the correlation values for the respective time period;
      combining the frequency representations of the correlation values for the plurality of time periods according to a plurality of data hypotheses, each data hypothesis of the plurality of data hypotheses indicating a possible data pattern for the encoded data in the signal, to produce combined frequency representations of the correlation values for the plurality of time periods;
   in accordance with a determination that a magnitude of a respective combined frequency representation of the correlation values for the plurality of time periods meets predefined criteria, selecting a frequency corresponding to the magnitude as a tracking frequency for the satellite; and
   determining a position of the GNSS receiver using the acquired signal at least in part by tracking the signal from the satellite using the tracking frequency.

2. The method of claim 1, wherein:
   each correlated segment of the plurality of samples of the signal corresponds to a length of time;
   the plurality of samples of the signal are generated using a coarse frequency hypothesis; and
   the method includes repeating the generating, correlating, performing the DFT, and combining operations with adjacent coarse frequency hypotheses that are separated by an amount less than or equal to an inverse of the length of time.

3. The method of claim 1, wherein the generating the plurality of samples of the signal includes:
   initially sampling the signal at an initial multiple of a frequency hypothesis; and
   decimating the initially sampled signal to produce the plurality of samples of the signal.

4. The method of claim 1, wherein:
   correlating the plurality of segments of the plurality of samples of the signal with the local copy of the pseudorandom code for the satellite for each respective time period of the plurality of time periods includes correlating n segments of the plurality of samples of the signal with the local copy of the pseudorandom code to produce n correlation values for each respective time period, wherein n is an integer greater than one;
   the DFT is an m-point DFT, wherein m is an integer greater than n; and
   performing the DFT includes using, as inputs, m−n zero values in addition to the n correlation values for the respective time period.

5. The method of claim 4, wherein:
   each correlated segment of the plurality of samples of the signal corresponds to a length of time; and
   an inverse of the length of time divided by m is less than a frequency tolerance for tracking the signal from the satellite using the tracking frequency.

6. The method of claim 4, wherein performing the DFT for a respective time period of the plurality of time periods includes:
   using, as inputs, the n correlation values for the respective time period, wherein the n correlation values are shifted by n inputs of the DFT compared with the n correlation values for a previous and adjacent time period of the plurality of time periods.

7. The method of claim 1, wherein the correlating, performing the discrete Fourier transform, and combining operations are performed for each of a plurality of code shift hypotheses.

8. The method of claim 1, wherein, for a respective frequency hypothesis, the correlating, performing the discrete Fourier transform, and combining operations are performed for each of a plurality of satellites.

9. The method of claim 1, wherein the respective time period is a period of a complete instance of the pseudorandom code.

10. A global navigation satellite system (GNSS) receiver, comprising:
    one or more processors; and
    memory storing instructions which, when executed by a global navigation satellite system (GNSS) receiver that includes one or more processors, cause the GNSS receiver to:
    acquire a signal from a satellite in a global navigation satellite system, wherein the signal includes encoded data and a pseudorandom code for the satellite, the acquiring including:
       for each respective time period of a plurality of time periods:
          generating a plurality of samples of the signal;
          correlating a plurality of segments of the plurality of samples of the signal with segments of a local copy of the pseudorandom code for the satellite, thereby producing a plurality of correlation values for the respective time period;

performing a discrete Fourier transform (DFT) using, as inputs, the plurality of correlation values for the respective time period, thereby producing a frequency representation of the correlation values for the respective time period;

combining the frequency representations of the correlation values for the plurality of time periods according to a plurality of data hypotheses, each data hypothesis of the plurality of data hypotheses indicating a possible data pattern for the encoded data in the signal, to produce combined frequency representations of the correlation values for the plurality of time periods;

in accordance with a determination that a magnitude of a respective combined frequency representation of the correlation values for the plurality of time periods meets predefined criteria, selecting a frequency corresponding to the magnitude as a tracking frequency for the satellite; and determine a position of the GNSS receiver using the acquired signal at least in part by tracking the signal from the satellite using the tracking frequency.

11. The global navigation satellite system (GNSS) receiver of claim 10, wherein:
each correlated segment of the plurality of samples of the signal corresponds to a length of time;
the plurality of samples of the signal are generated using a coarse frequency hypothesis; and
the method includes repeating the instructions further cause the GNSS receiver to repeat the generating, correlating, performing the DFT, and combining operations with adjacent coarse frequency hypotheses that are separated by an amount less than or equal to an inverse of the length of time.

12. The global navigation satellite system (GNSS) receiver of claim 10, wherein the generating the plurality of samples of the signal includes:
initially sampling the signal at an initial multiple of a frequency hypothesis; and
decimating the initially sampled signal to produce the plurality of samples of the signal.

13. The global navigation satellite system (GNSS) receiver of claim 10, wherein:
correlating the plurality of segments of the plurality of samples of the signal with the local copy of the pseudorandom code for the satellite for each respective time period of the plurality of time periods includes correlating n segments of the plurality of samples of the signal with the local copy of the pseudorandom code to produce n correlation values for each respective time period, wherein n is an integer greater than one;
the DFT is an m-point DFT, wherein m is an integer greater than n; and
performing the DFT includes using, as inputs, m−n zero values in addition to the n correlation values for the respective time period.

14. The global navigation satellite system (GNSS) receiver of claim 13, wherein:
each correlated segment of the plurality of samples of the signal corresponds to a length of time; and
an inverse of the length of time divided by m is less than a frequency tolerance for tracking the signal from the satellite using the tracking frequency.

15. The global navigation satellite system (GNSS) receiver of claim 13, wherein performing the DFT for a respective time period of the plurality of time periods includes:

using, as inputs, the n correlation values for the respective time period, wherein the n correlation values are shifted by n inputs of the DFT compared with the n correlation values for a previous and adjacent time period of the plurality of time periods.

16. A non-transitory computer-readable storage medium storing instructions which, when executed by a global navigation satellite system (GNSS) receiver that includes one or more processors, cause the GNSS receiver to:
acquire a signal from a satellite in a global navigation satellite system, wherein the signal includes encoded data and a pseudorandom code for the satellite, the acquiring including:
for each respective time period of a plurality of time periods:
generating a plurality of samples of the signal;
correlating a plurality of segments of the plurality of samples of the signal with segments of a local copy of the pseudorandom code for the satellite, thereby producing a plurality of correlation values for the respective time period;
performing a discrete Fourier transform (DFT) using, as inputs, the plurality of correlation values for the respective time period, thereby producing a frequency representation of the correlation values for the respective time period;
combining the frequency representations of the correlation values for the plurality of time periods according to a plurality of data hypotheses, each data hypothesis of the plurality of data hypotheses indicating a possible data pattern for the encoded data in the signal, to produce combined frequency representations of the correlation values for the plurality of time periods;
in accordance with a determination that a magnitude of a respective combined frequency representation of the correlation values for the plurality of time periods meets predefined criteria, selecting a frequency corresponding to the magnitude as a tracking frequency for the satellite; and
determine a position of the GNSS receiver using the acquired signal at least in part by tracking the signal from the satellite using the tracking frequency.

17. The non-transitory computer-readable storage medium of claim 16, wherein:
each correlated segment of the plurality of samples of the signal corresponds to a length of time;
the plurality of samples of the signal are generated using a coarse frequency hypothesis; and
the instructions further cause the GNSS receiver to repeat the generating, correlating, performing the DFT, and combining operations with adjacent coarse frequency hypotheses that are separated by an amount less than or equal to an inverse of the length of time.

18. The non-transitory computer-readable storage medium of claim 16, wherein the generating the plurality of samples of the signal includes:
initially sampling the signal at an initial multiple of a frequency hypothesis; and
decimating the initially sampled signal to produce the plurality of samples of the signal.

19. The non-transitory computer-readable storage medium of claim 16, wherein:
correlating the plurality of segments of the plurality of samples of the signal with the local copy of the pseudorandom code for the satellite for each respective time period of the plurality of time periods includes correlating n segments of the plurality of samples of the signal with the local copy of the pseudorandom code to produce n correlation values for each respective time period, wherein n is an integer greater than one;

the DFT is an m-point DFT, wherein m is an integer greater than n; and performing the DFT includes using, as inputs, m−n zero values in addition to the n correlation values for the respective time period.

20. The non-transitory computer-readable storage medium of claim 19, wherein:

each correlated segment of the plurality of samples of the signal corresponds to a length of time; and an inverse of the length of time divided by m is less than a frequency tolerance for tracking the signal from the satellite using the tracking frequency.

* * * * *

UNITED STATES PATENT AND TRADEMARK OFFICE
CERTIFICATE OF CORRECTION

PATENT NO. : 11,630,217 B2
APPLICATION NO. : 16/862360
DATED : April 18, 2023
INVENTOR(S) : Yu et al.

It is certified that error appears in the above-identified patent and that said Letters Patent is hereby corrected as shown below:

In the Claims

Claim 11, Column 29, Line 29, please delete "the method includes repeating the instructions" and insert --the instructions--.

Signed and Sealed this
Twenty-ninth Day of August, 2023

Katherine Kelly Vidal
*Director of the United States Patent and Trademark Office*